United States Patent [19]

Hamada et al.

[11] Patent Number: 5,826,035

[45] Date of Patent: Oct. 20, 1998

[54] IMAGE DISPLAY APPARATUS

[75] Inventors: Nagaharu Hamada, Hitachi; Toshiro Kamiuchi, Tokyo; Ikuo Hikawa; Takashi Nakasugi, both of Yokohama; Takashi Azuma, Chigasaki; Chiharu Takayama, Yokohama, all of Japan

[73] Assignee: Hitachi, Ltd., Tokyo, Japan

[21] Appl. No.: 854,837

[22] Filed: May 12, 1997

Related U.S. Application Data

[63] Continuation-in-part of Ser. No. 459,835, Jun. 2, 1995, Pat. No. 5,657,248.

[30] Foreign Application Priority Data

Jun. 10, 1994 [JP] Japan ................................ 6-128719

[51] Int. Cl.$^6$ .................................................... G01R 13/00
[52] U.S. Cl. ................... 395/200.77; 395/200.32; 345/2; 382/232; 358/505
[58] Field of Search .............. 395/200.32, 200.61, 395/200.77, 280, 286; 345/2, 3; 382/232; 358/505, 508, 530, 401, 444, 448; 369/29, 32, 33

[56] References Cited

U.S. PATENT DOCUMENTS 5,721,884  2/1998  Shishizuka et al. ............. 395/200.77
5,724,537  3/1998  Jones ............................... 395/200.77

*Primary Examiner*—Thomas Peeso
*Attorney, Agent, or Firm*—Frohwitter

[57] ABSTRACT

An image display apparatus having a computer system and an image processor. The computer system includes: a personal computer having a CPU and a main memory; and input/output apparatuses such as magneto-optical disk drive, image scanner, full color printer, etc. The image processor which commonly uses a system bus of the computer system includes an independent dedicated image bus, a compression/expansion unit, an image memory read/write controller, image memories, and a video processor. Image data which is sent from the magneto-optical disk drive is decoded by the compression/expansion unit and is held in the image memories. The image data of the image memories is transferred to the video processor through a dedicated signal line and is displayed on a large screen projection display.

13 Claims, 20 Drawing Sheets

| Command Name | Command ID | Parameter | Function |
|---|---|---|---|
| Network Connection | C1 | Network ID | Connect to computer of network ID |
| Network Disconnection | C2 | Network ID | Disconnect to computer of network ID |
| Scenario Reproduction | C3 | File Name | Reproduce scenario of file name |
| Scenario Pause | C4 | Scenario ID | Temporarily stop scenario reproduction of scenario ID |
| Scenario Stop | C5 | Scenario ID | Stop scenario reproduction of scenario ID |
| Image Reproduction | C6 | File name, reproduction attribute | Display image of file name by display attribute |
| Image Transfer | C7 | Transfer destination, position attribute | Transfer image of image position attribute to transfer |
| Effect Execution | C8 | Effect name, Effect attribute | Execute effect of effect name and effect attribute |
| Audio Reproduction | C9 | File Name | Reproduce audio of file name |
| Audio Pause | C10 | Audio ID | Temporarily stop reproduction of audio ID |
| Audio Stop | C11 | Audio ID | Stop audio of audio ID |
| Time Control | C12 | Time information, action | Execute action by time of time information |
| Flow Control | C13 | Control name (if, while, etc.) | Execute function of control name |
| Mouse Input Execution | C14 | Input attribute, action | Execute action when there is input of input attribute |
| Cursor Control | C15 | Cursor attribute | Execute cursor control in accordance with cursor attribute |
| Key Input Report | C16 | Input attribute, action | Execute action when there is input of input attribute |
| State Report | C17 | Report attribute, report destination | Transmit present state to report destination in accordance with report attribute |
| State Report Request | C18 | Request destination, request attribute | Request report destination to report state adaptive to request attribute |
| File Writing | C19 | File name, data | Record data by designated file name |
| File Transmission | C20 | Transmission destination, file name | Transmit data of file name to transmission destination |
| Media Report | C21 | Report destination | Transmit contents of media which can be used at present to report destination |
| Directory Report | C22 | Directory name, report destination | Transmit contents of directory to report destination |
| File Report | C23 | File name, report destination | Transmit file attribute of file name to report destination |
| Database Formation | C24 | Database attribute | Form database in accordance with database attribute |
| Database Retrieval | C25 | Retrieving conditions | Retrieve database in accordance with retrieving conditions |
| Database Edition | C26 | Edition attribute | Edit database in accordance with edition attribute |
| Database Registration | C27 | Retrieval information, registration data | Register registration data on the basis of retrieving conditions |
| Command Setting | C28 | Network ID, command | Set command to apparatus of network ID |
| Command Execution | C29 | Network ID, command | Execute commands which were set to apparatus of network ID |
| Simultaneous Command Execution | C30 | A plurality of network IDs | Simultaneously execute set commands of a plurality of network ID apparatuses |
| Scenario test | C31 | File Name | Test whether scenario of file name can be reproduced |
| Command report | C32 | Report destination | Report command which can be executed at present to report destination |

Figure 10

| Row No. | Operation Scenario | Description |
|---|---|---|
| 1 | C12 (8 o'clock, action A); | Execute action A at 8 o'clock |
| 2 | C12 (12 o'clock, action B); | Execute action B at 12 o'clock |
| 3 | C12 (17 o'clock, action C); | Execute action C at 17 o'clock |
| 4 | Action A{ | Start action A |
| 5 | C29 (1K, C6 (image A, display)); | Display image A in 1K |
| 6 | C29 (1F, C6 (image B, display)); | Display image B in 1F |
| 7 | } | Finish action |
| 8 | Action B{ | Start action B |
| 9 | C29 (1K, C3 (scenario A)); | Reproduce scenario A in 1K |
| 10 | C29 (1F, C3 (scenario B)); | Reproduce scenario B in 1F |
| 11 | } | Finish action B |
| 12 | Action C{ | Start action C |
| 13 | C29 (1K, C9 (audio A)); | Reproduce audio A in 1K |
| 14 | C29 (1F, C9 (audio B)); | Reproduce audio B in 1F |
| 15 | } | Finish action C |

Figure 19

| Row No. | Synchronous Reproduction Scenario | Description |
|---|---|---|
| L1 | C28(1G, C6(image A, display)); | Set C6 command to 1G |
| L2 | C28(1H, C6(image B, display)); | Set C6 command to 1H |
| L3 | C28(1J, C6(image C, display)); | Set C6 command to 1J |
| L4 | C30(1G, 1H, 1J); | Simultaneously execute commands which were set in 1G, 1H, and 1J |
| L5 | C29(1G, C6(image D, load to back display plane)); | Execute C6 command in 1G |
| L6 | C29(1H, C6(image E, load to back display plane)); | Execute C6 command in 1H |
| L7 | C29(1J, C6(image F, load to back display plane)); | Execute C6 command in 1J |
| L8 | C28(1G, C8(effect A, 3 sec.)); | Set C6 command to 1C |
| L9 | C28(1H, C8(effect B, 3 sec.)); | Set C8 command to 1H |
| L10 | C28(1J, C8(effect C, 3 sec.)); | Set C8 command to 1J |
| L11 | C14(move range A, action A); | Execute action A when mouse moves range A |
| L12 | C14(move range B, action B); | Execute action B when mouse moves range B |
| L13 | C14(move range C, action C); | Execute action C when mouse moves range C |
| L14 | C14(click in range A, action D); | Execute action D when mouse is clicked in range A |
| L15 | C14(click in range B, action E); | Execute action E when mouse is clicked in range B |
| L16 | C14(click in range C, action F); | Execute action F when mouse is clicked in range C |
| L17 | Action A{ | Start action A |
| L18 | C29(1G, C15(display to moving position)); | Display cursor to moving position in 1G |
| L19 | } | Finish action A |
| L20 | Action B{ | Start action B |
| L21 | C29(1H, C15(display to moving position)); | Display cursor to moving position in 1H |
| L32 | } | Finish action B |
| L33 | Action C{ | Start action C |
| L34 | C29(1J, C15(display to moving position)); | Display cursor to moving position n 1J |
| L35 | } | Finish action C |
| L36 | Action D{ | Start action D |
| L37 | C30(1G); | Execute command set in L6 to 1G |
| L38 | } | Finish action D |
| L39 | Action E{ | Start action E |
| L40 | C30(1G, 1H); | Execute command set in L8 to 1G and 1H |
| L41 | } | Finish action E |
| L42 | Action F{ | Start action F |
| L43 | C30(1G, 1H,1J); | Execute command set in L10 to 1G, 1H, and 1J |
| L44 | } | Finish action F |

Figure 20

IMAGE DISPLAY APPARATUS

CROSS-REFERENCE TO RELATED APPLICATIONS

The present application is a continuation-in-part of U.S. application Ser. No. 08/459,835, filed in the U.S. Patent and Trademark Office on Jun. 2, 1995, U.S. Pat. No. 5,657,248 for which the issue fee has been paid but which has not yet been issued, which parent application claims priority to Japanese Patent Application No. 06-128719 filed in the Japanese Patent Office on Jun. 10, 1994.

BACKGROUND OF THE INVENTION

The present invention relates to a display apparatus of an image and, more particularly, to a display apparatus of an image suitable for a business such as museum of arts, museum, broadcasting station, publishing company, video production, photographing studio, public relations division of government and public offices and general enterprises, and the like to create, keep, and reuse image data such as photograph, illustration, picture, or the like.

Hitherto, as means for fetching image data such as photograph, picture, or the like into a computer and for reproducing and displaying it as necessary, there were many dedicated apparatuses mainly constructed of a recording medium of a large capacity using a light or magnetism. In recent years, in association with an improvement of a processing ability or display ability of a personal computer (hereinbelow, referred to as a PC), the use of a system in which the PC and a magneto-optical (MO) disk are combined is started. As a prior art of an image display apparatus of the invention, there is a still picture system which is widespread as "Technical guidelines for the exhibition type HDTV still picture disc system (HVC (Hi-Vision Promotion Center) guidelines)", July 1991, pages 7, 13, 14 and 54. According to such a system, still picture data of three display planes (A, B, and C planes) are previously prepared in a memory and a switching operation (dissolve, wipe, or the like) of display planes and a simultaneous display of two display planes, or the like is performed, thereby enabling a presentation effect to be raised. Such an image system is mainly divided to the following two kinds.

(1) Image memory board standard (I/O) bus connecting system

This system is a system which is realized by adding an image memory board in which a processor, a memory, a display controller, and the like adapted to handle image data are installed to an (I/O) expansion slot [standard (I/O) bus] of a PC or workstation. The above system is disclosed in, for example, H. Okamoto et al., "Presentation System using High Definition Still Picture System," The Institute of Television Engineers of Japan, Vol. 47, No. 12, pp. 1669–1672, 1993.

(2) Image memory unit I/O interface connecting system

The system is realized in a manner such that an image data memory unit having therein a processor, a memory, and a display controller which are adapted to handle image data, is housed in an independent or separate casing different from a PC (personal computer) and the memory unit and the PC are connected by a standard I/O interface (RS232-C, SCSI, or the like). The system is, for example, disclosed in O. Tanno et al., "Moving Picture Storage & Display System for Super-High Definition Images," The Institute of Television Engineers of Japan, Vol. 47, No. 6, pp. 909–910, 1993 and JP-A-3-179493.

SUMMARY OF THE INVENTION

Of the above conventional techniques, the image data memory board standard (I/O) bus connecting system of (1) has a problem such that since a data transfer rate (several MB/second) in a PC standard bus is low because compressed image data and its expanded image data are transferred by commonly using the same PC standard bus, a display effect (display plane read-out time<2 seconds, wipe/dissolve time or the like<0.5 second) specified by operation guidelines (HVC guidelines) of the exhibition type HDTV still picture file cannot be realized at a high speed. In the case of the image data memory unit I/O interface connecting system of (2), since the PC (personal computer) and the image data memory unit are installed in different casings, it is necessary to create a dedicated control software in order to make peripheral equipment attached to the image data memory unit operative. In the case where a functional expansion or an improvement of a performance such that a processing speed of the peripheral equipment is raised or the like is accomplished, a dedicated control software has to be formed every time. Since the PC and the image data memory unit are installed in different casings, further, there is a drawback such that a setting occupied area of the hardware increases.

It is an object of the invention to provide an image display apparatus which can solve the above problems.

It is another object of the invention to provide a high speed image display apparatus.

According to one aspect of the invention, an image display apparatus of the invention is made up of a computer which is connected to an input/output bus (system bus) and has a file apparatus to store a plurality of images as compressed digital data, a decoding apparatus to decode the compression data outputted from the file apparatus to an original image, image memories to store at least two display planes of the decoded image from the decoding apparatus, a video processing apparatus for reading out the decoded image from the image memories and converting to a signal for display, and a display apparatus to display an output of the video processing apparatus as a color image.

The compression data from the file apparatus is transmitted to the decoding apparatus through a system bus serving as an I/O bus of the computer, the decoding apparatus transfers the expanded image data to the image memories through the dedicated image data bus, and the display data from the image memory is transferred to the video processing apparatus through a dedicated signal line, thereby displaying an image to a large screen projection display at a high speed.

Preferably, the computer, decoding apparatus, image memories, and video processing apparatus are enclosed in the same casing.

BRIEF DESCRIPTION OF THE DRAWINGS

FIG. 10 shows an example of control commands of the image display apparatus 1C.

FIG. 19 shows an example of an operation management scenario to control the operation and management of a plurality of image display apparatuses.

FIG. 20 shows an example of a synchronous reproduction scenario to synchronously reproduce and control in a plurality of image display apparatuses.

DESCRIPTION OF THE PREFERRED EMBODIMENTS

Figure 1:
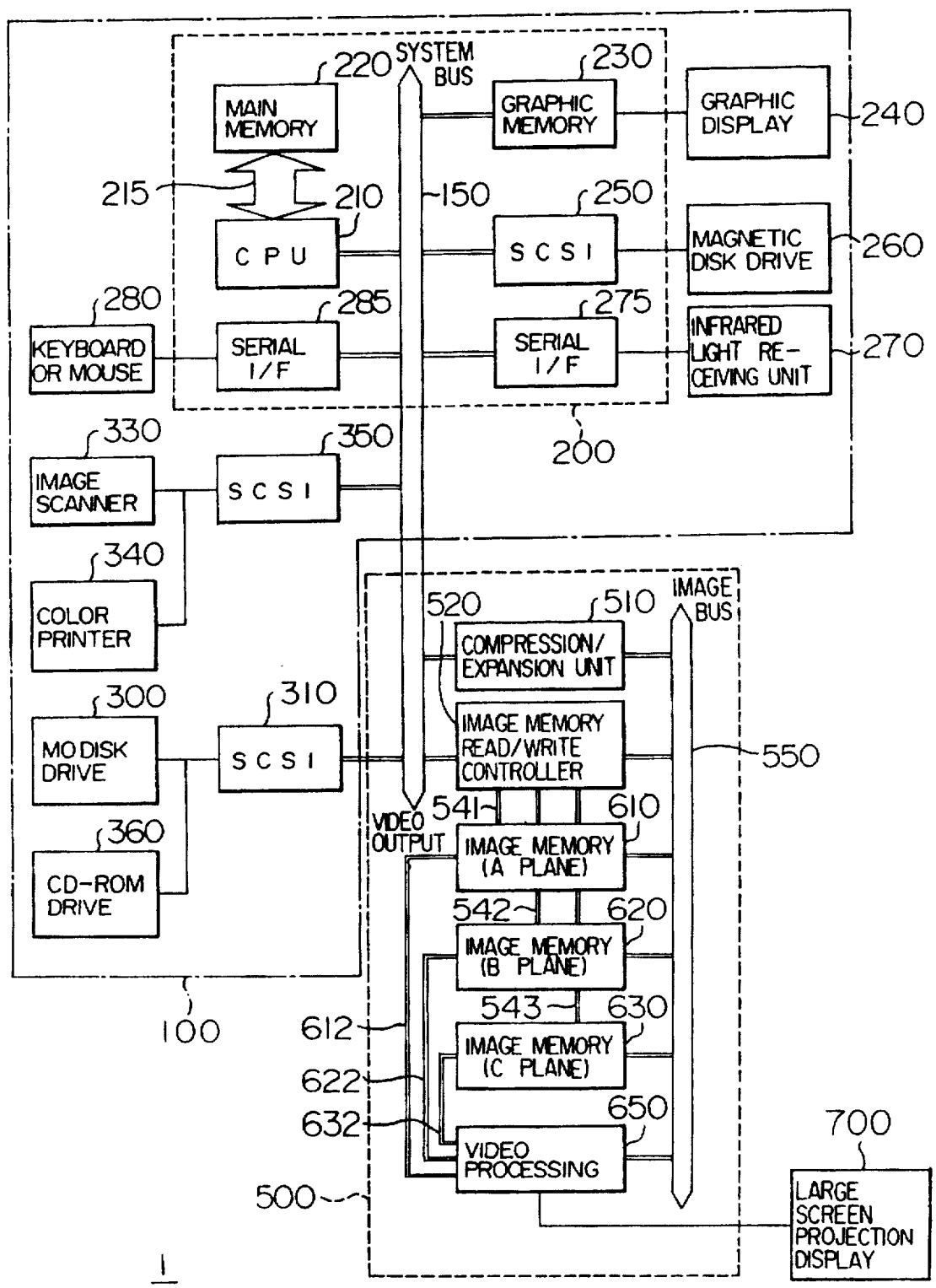
FIG. 1 is a block diagram showing a system construction of an embodiment of an image display apparatus of the invention.

An embodiment of the invention will now be described hereinbelow with reference to FIGS. 1 to 20. FIG. 1 is a block diagram showing a system construction of an embodiment of an image display apparatus of the invention. The image display apparatus of the invention shown by reference numeral 1 as a whole has a computer system 100 and an image processing unit 500 and displays an image to a large screen projection display 700. The computer system 100 is a computer system having, for example, a workstation, a personal computer of a desk-top type, or other small computer as a computer main body.

As a large screen projection display 700, there is a high definition display having a resolution of (1280×1024) dots, (1600×1200) dots, (1920×1035) dots, or the like. In the embodiment, a display image of the resolution of (1280× 1024) dots is subjected to a non-interlace 72 times per second, thereby obtaining a color image having a high definition without flickering. As such a large screen projection display 700, not only a CRT display but also a display of an interlace type can be used so long as the occurrence of flickering is permitted.

A construction of the computer system 100 will now be described hereinbelow.

The computer system 100 has a computer main body 200 made up of, for example, a personal computer and functioning as a central processing unit. The whole computer system 100 is connected by a system bus 150 serving as an I/O bus of the computer. The computer main body 200, I/O interfaces 310 and 350, and the image processing unit 500 are housed in the same casing. Alternatively, it is also possible to use a construction such that the computer main body 200, I/O interfaces 310 and 350, image processing unit 500, a magnetic disk drive 260, a magneto-optical disk drive 300, and a CD-ROM apparatus 360 are housed in the same casing and media necessary for information reproduction by the computer system 100 can be inserted in the same casing.

The computer main body 200 includes a CPU 210 and a main memory 220 which are interconnected through a high speed memory bus 215. The CPU 210 is connected to the system bus 150. A graphic memory 230 which is connected to the system bus 150 stores graphic data and transfers the graphic data to a graphic display 240 (for example, a display of 17 inches) which is connected to the graphic memory 230 through a D/A converter (not shown), thereby displaying the graphic data.

The magnetic disk drive 260 is connected to the system bus 150 through an input/output interface 250.

As input means, the computer main body 200 has a keyboard or mouse 280 which is connected to the system bus 150 through an interface 285. The computer main body further has an infrared light receiving unit 270 to receive a signal from a remote control unit (not shown). The unit 270 is connected to the system bus 150 through an interface 275.

The magneto-optical disk drive 300 supplies image data of a still picture or motion picture recorded on a magneto-optical disk to the system bus 150 through the I/O interface 310.

When the still picture image data recorded on the magneto-optical disk is displayed to the large screen projection display 700, a vocal explanation, music, and the like synchronized with a display plane are outputted, thereby raising a presentation effect. Such audio data is prepared by a CD-ROM and is reproduced by a CD-ROM drive 360. The CD-ROM drive 360 is connected to the system bus 150 through the I/O interface 310 and is controlled. The reproduced audio data is transmitted to an amplifier (not shown) and is outputted from a loud speaker (not shown).

An image scanner 330 which is connected to the system bus 150 through the I/O interface 350 has a resolution of, for example, 400 dpi and is used when image data is inputted from an original picture, which will be described hereinlater. A color printer 340 prints a still picture in a full color (1677 million colors).

Processes for deriving image data from an original image and recording the same into a magneto-optical disk will now be described hereinbelow with reference to FIGS. 2 and 3.

Figure 2:
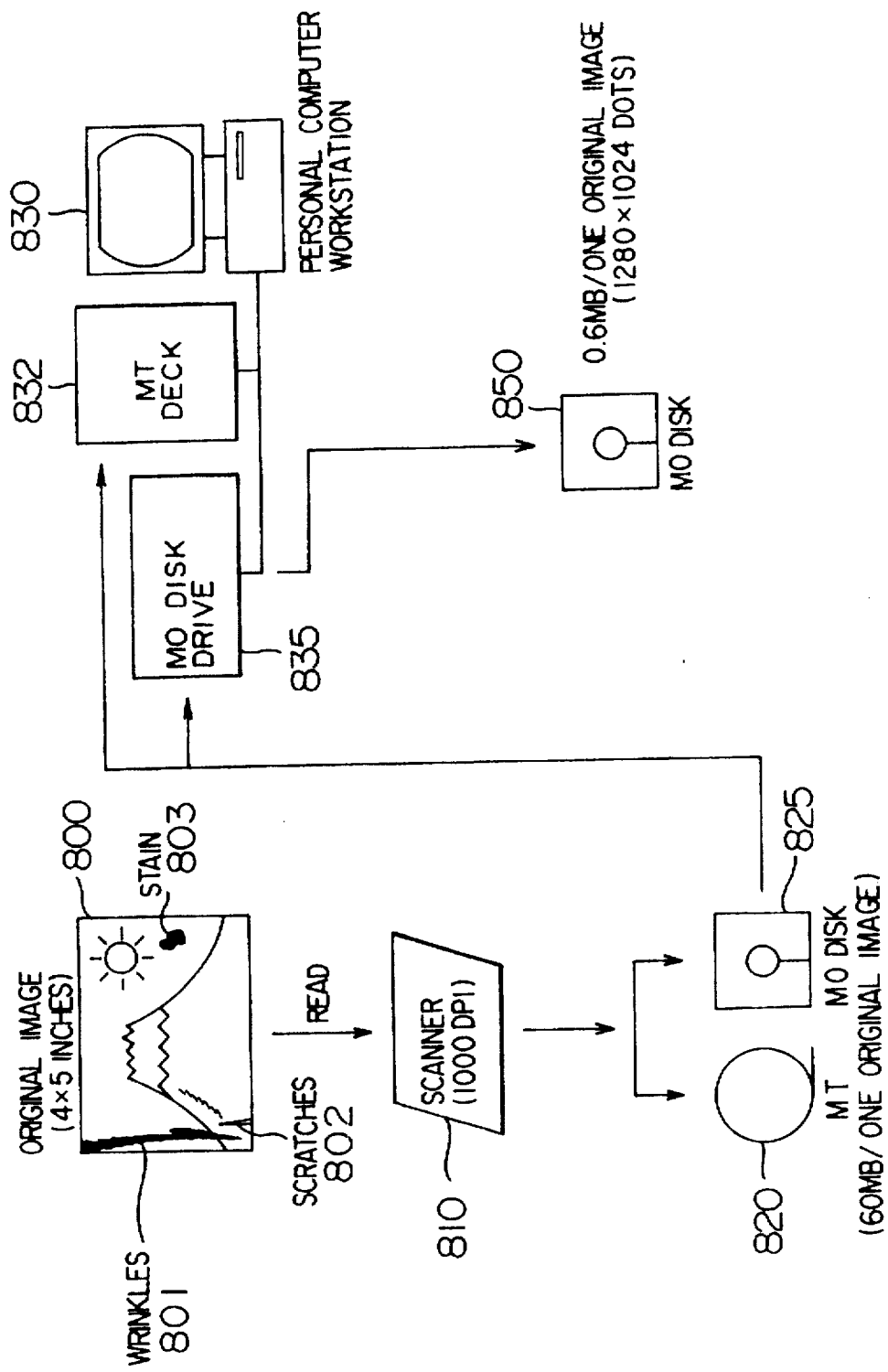
FIG. 2 is a diagram useful for explaining a process of forming image display data.

FIG. 2 is an explanatory diagram showing a forming process of image display data which is recorded onto a magneto-optical disk.

An original picture 800 serving as a material is first prepared in a format of a positive film of, for example, (4×5) inches. There is a case where the original picture 800 includes wrinkles 801, scratches 802, a stain 803, and the like. The original picture 800 is inputted by an image scanner 810 having a high resolution and is recorded to a magnetic tape 820 or a magneto-optical disk 825. As an image scanner 810, an image scanner having a resolution of, for example, 1000 dpi is used. Primary data of an image digitized by a capacity of, for example, 60 MB/(one original picture) is recorded in the magnetic tape 820 or magneto-optical disk 825.

The magnetic tape 820 or magneto-optical disk 825 in which the primary data of the image has been recorded is subsequently loaded in a magnetic tape deck 832 or a magneto-optical disk drive 835 of a PC or workstation 830, thereby executing a process of the primary data.

As a process of the primary data, in addition to a compressing process, various kinds of processing softwares such as edge enhancement of the image, color correction, elimination of a dirt or stain on the original picture, and the like can be used in accordance with an improvement of an image quality or a purpose of image display.

As a correcting method, a part of the original image can be changed by a correction such as elimination of, for example, the wrinkles 801, scratches 802, and stain 803, on the original picture 800 or the like.

Secondary data of the image subjected to the above process is recorded in a magneto-optical disk 850. In case of a display plane of, for example, (1280×1024) dots, the secondary data of the image has a capacity of, for example, 0.6 MB/(one original picture), so that it is compressed to $\frac{1}{100}$ as compared with the primary data.

Figure 3:
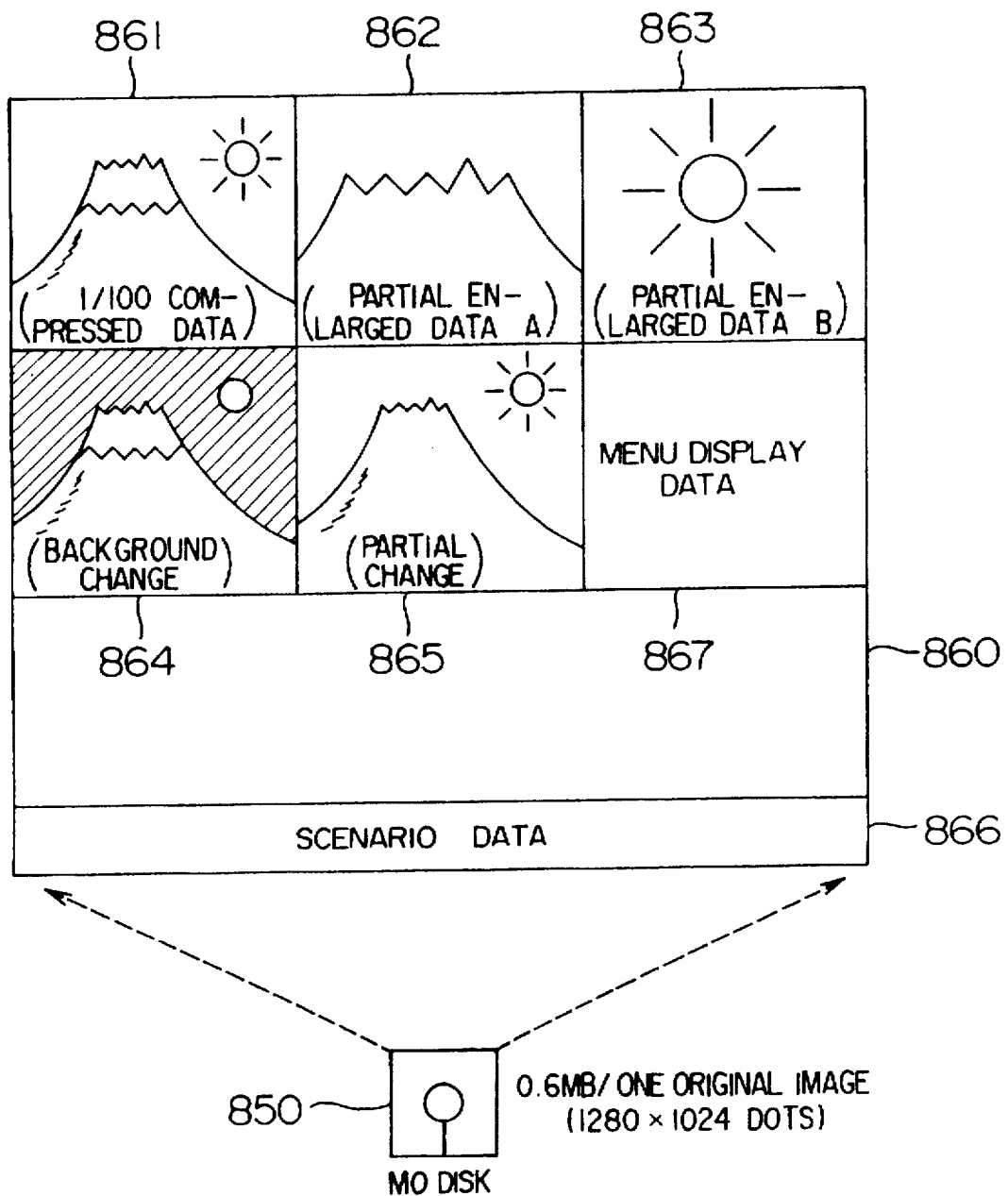
FIG. 3 is a diagram useful for explaining data contents of an image file.

FIG. 3 is an explanatory diagram showing an image file format which is recorded in the magneto-optical disk 850.

Several data obtained by processing the primary data of the original picture is recorded in an image file 860. First image data 861 is data obtained by compressing the primary data to $\frac{1}{100}$, second image data 862 is partial enlarged data (A) obtained by enlarging a part of the original picture, and third image data 863 is partial enlarged data (B) obtained by enlarging the other portions of the original picture. Fourth image data 864 is data in which a back color of the original picture was changed and fifth image data 865 is data in which the original picture was partially corrected.

Sixth data 866 is scenario data (control data) and is a control program to determine when the image data or audio data is to be reproduced and how long the reproduction is continued, and, further, to designate its switching method or the like as a reproduction sequence.

Although record lengths of the above image data differ from each other, now assuming that one image data has a capacity of 0.6 MB as an average, about 1000 secondary image data can be stored in one magneto-optical disk having a capacity of 600 MB.

The magneto-optical disk 850 in which the previously processed image data was recorded is loaded to the magneto-optical disk drive 300 of the image display apparatus 1 of the present invention.

An image processing unit as a main component element of the invention will now be described with reference to FIGS. 1, 3, 4, 5, and 8.

The whole operation of the image processing unit 500 surrounded by a broken line in FIG. 1 is controlled by an image processing program 920 (created for the image display apparatus of the invention) stored in the main memory 220 of the computer main body 200. The image processing unit 500 includes a compression/expansion unit 510 and an image memory read/write controller 520 which are connected to the system bus 150.

Figure 8:
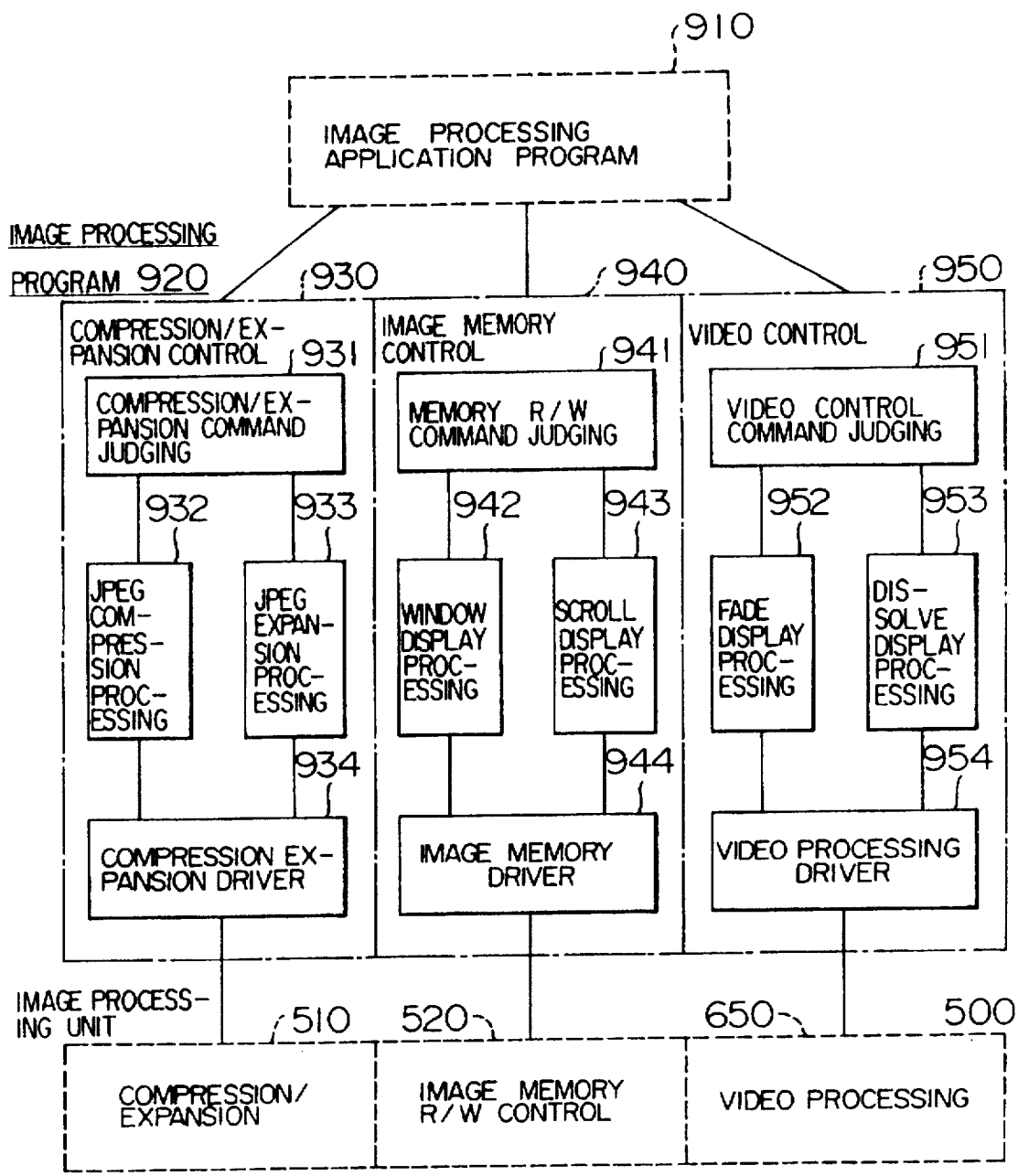
FIG. 8 is a constructional diagram of functions of an image processing program for allowing an image processing unit in FIG. I to function.

FIG. 8 is a constructional diagram of functions of the image processing program 920 to allow the image processing unit 500 to function.

The image processing unit 920 is activated by the image processing application program 910 such as reading of image data from an image scanner, processing/recording of the read-out image data, forming/editing/recording of a reproduction scenario by image data and audio data, reproducing/displaying of image/audio by the recording scenario, and the like.

The image processing program 920 is made up of a compression/expansion control section 930, an image memory control section 940, and a video control section 950. Those control sections are constructed of command judging sections 931, 941, 951, processing sections 932 and 933, 942 and 943, and 952 and 953 each for one function, and drivers 934, 944, and 954 for respective hardwares, respectively.

The compression/expansion control section 930 is activated by a request of the process for compression or expansion of the image data from the image processing application program 910. A relevant processing program is selected from the compression/expansion processing modules 932 and 933 by the compression/expansion command judging section 931, thereby driving the compression/expansion unit 510 of the image processing unit 500 through the compression/expansion driver 934.

The image memory control unit 940 is activated by a request to read out or write the image data existing in the image memories 610 to 630 from the image processing application program 910. A relevant processing program is selected from the processing modules 942 and 943 by the memory R/W command judging section 941, thereby driving the image memory R/W controller 520 of the image processing unit 500 through the image memory driver 944.

The video control section 950 is activated by a request for processing the display image data in the video processing unit 650 from the image processing application program 910. A relevant processing program is selected from the processing modules 952 and 953 by the video control command judging section 951, thereby driving the video processing unit 650 of the image processing unit 500 through the video processing driver 954.

The operation of the compression/expansion unit 510 is controlled by the image processing program stored in the main memory 220 of the computer main body 200. The unit 510 has a function to expand the compressed image data recorded in the magneto-optical disk and store in the image memories and a reverse function, namely, a compressing function to record the image data from the image memories in the magneto-optical disk.

With respect to the expanding function, for example, 0.6 MB/(one original picture) is expanded to 3 MB/(one original picture) and, with respect to the compressing function, the reverse holds true.

The compression/expansion unit 510 further has a direct passing function to directly connect the system bus 150 and an image bus 550 without executing the compression/expansion.

The image processing unit 500 is separated from the system bus 150 and has the dedicated image data bus (referred to as an image bus) 550 having a data transfer rate (for example, 60 MB/S which is about two to four times as high as a transfer rate of the system bus 150) which is higher than a data transfer rate (for example, 16 MB/S, 32 MB/S) of the system bus. The compression/expansion unit 510 and image memory read/write controller 520 are connected to the image bus 550.

Three image memories 610, 620, and 630 each constructed of a dual port type video RAM device are connected to the image bus 550. Each of the image memories 610, 620, and 630 has a capacity of 12 MB. For example, in case of a display of (1280×1024) dots/(one display plane), image data of four display planes can be stored by allocating three bytes/one dot. As such image data of four display planes, some of partial pictures obtained by dividing the original picture into four portions may be stored as partial enlarged data as shown in FIG. 3 or a plurality of pictures obtained by dividing an elongated original image such as a hanging picture may be stored.

Figure 4:
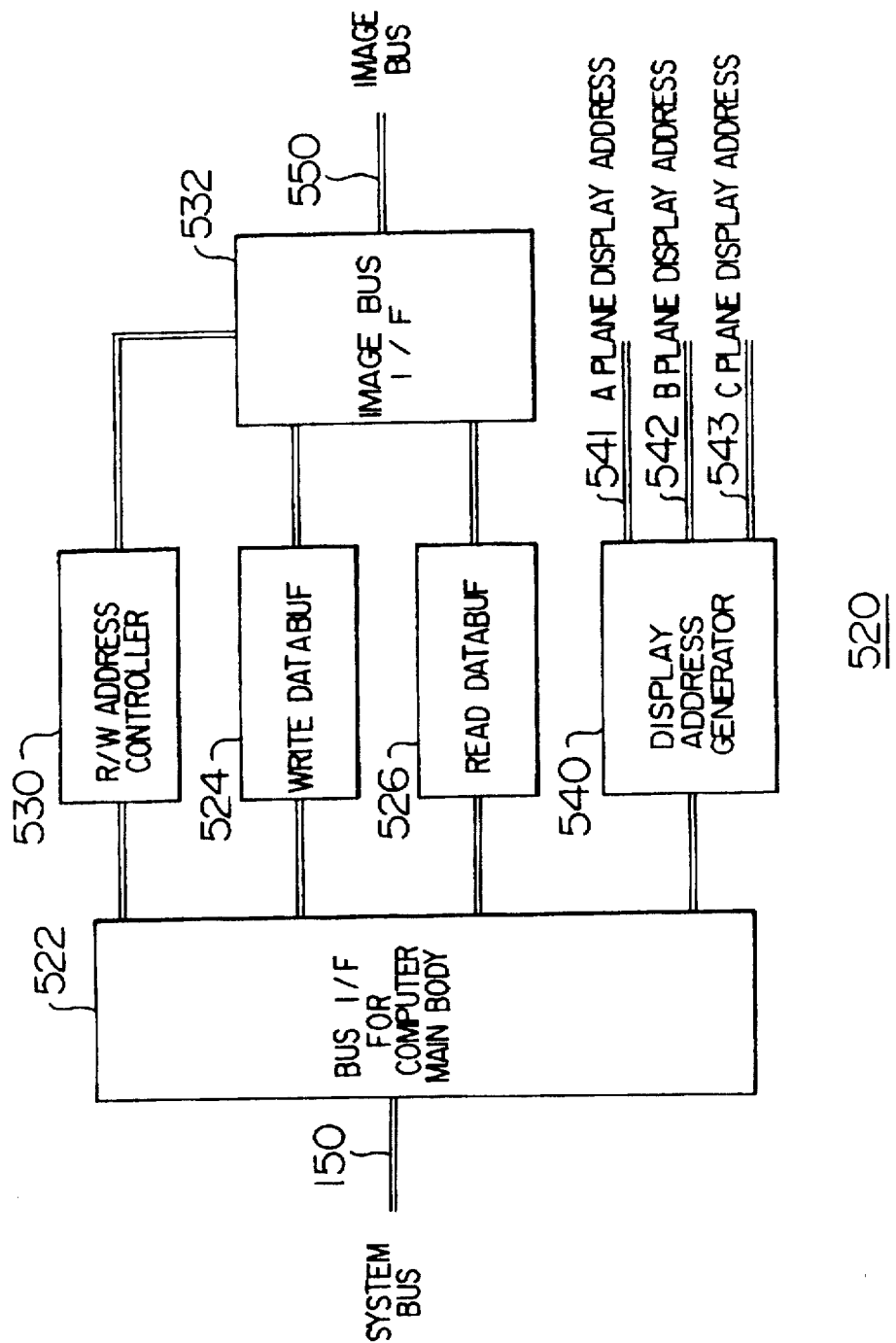
FIG. 4 is a block diagram showing a circuit construction of an image memory read/write controller which is used in the system of FIG. 1.

FIG. 4 is a block diagram showing a specific circuit construction of the image memory read/write controller 520.

The image memory read/write controller 520 has: a PC bus interface 522; a read/write address controller 530; a write data buffer 524; a read data buffer 526; an image bus interface 532; and a display address generator 540.

The operation of the image memory read/write controller 520 is controlled by the image processing program stored in the main memory 220 in the computer main body 200.

The bus interface 522 for the computer main body is connected to the system bus 150. The data in the main memory 220 is outputted to the image bus 550 through the write data buffer 524, image bus interface 532 by means of the image processing program and is stored into the image memories 610, 620, and 630.

The image data read out from the image memories 610, 620, and 630 is supplied to the image bus 550 and image bus interface 532 and is sent to the bus interface 522 for the computer main body through the read data buffer 526. The read data is stored in the main memory 220.

The read/write address controller 530 has a function to continuously generate addresses to read/write for predetermined areas of the image memories 610, 620, and 630. Further, the read/write address controller 530 has an address converter (not shown) (address converting function) for using the image memories 610, 620, and 630 as expansion memories of the main memory 220 of the computer system 100. Namely, by such an address converting function, the image memories 610, 620, and 630 are arranged in the same address space as that of the main memory 220. When using the image memories as expansion memories, memory areas in which no image data is stored in the image memory having a capacity of 36 MBytes as a whole can be effectively used, so that a use efficiency of the image memory is improved and a use efficiency of the whole image display apparatus is improved.

The display address generator 540 has a function of reading out the image data from a predetermined rectangular region of the image data stored in the image memories 610, 620, and 630 and of generating continuous addresses to display. Therefore, by designating a rectangular region, it is possible to display image data extending over a plurality of image plane regions. Further, an arbitrary region of an original image can be window-displayed or can be scroll-displayed. The display addresses are supplied to the image memories 610, 620, and 630 through signal lines 541, 542, and 543.

Figure 5:
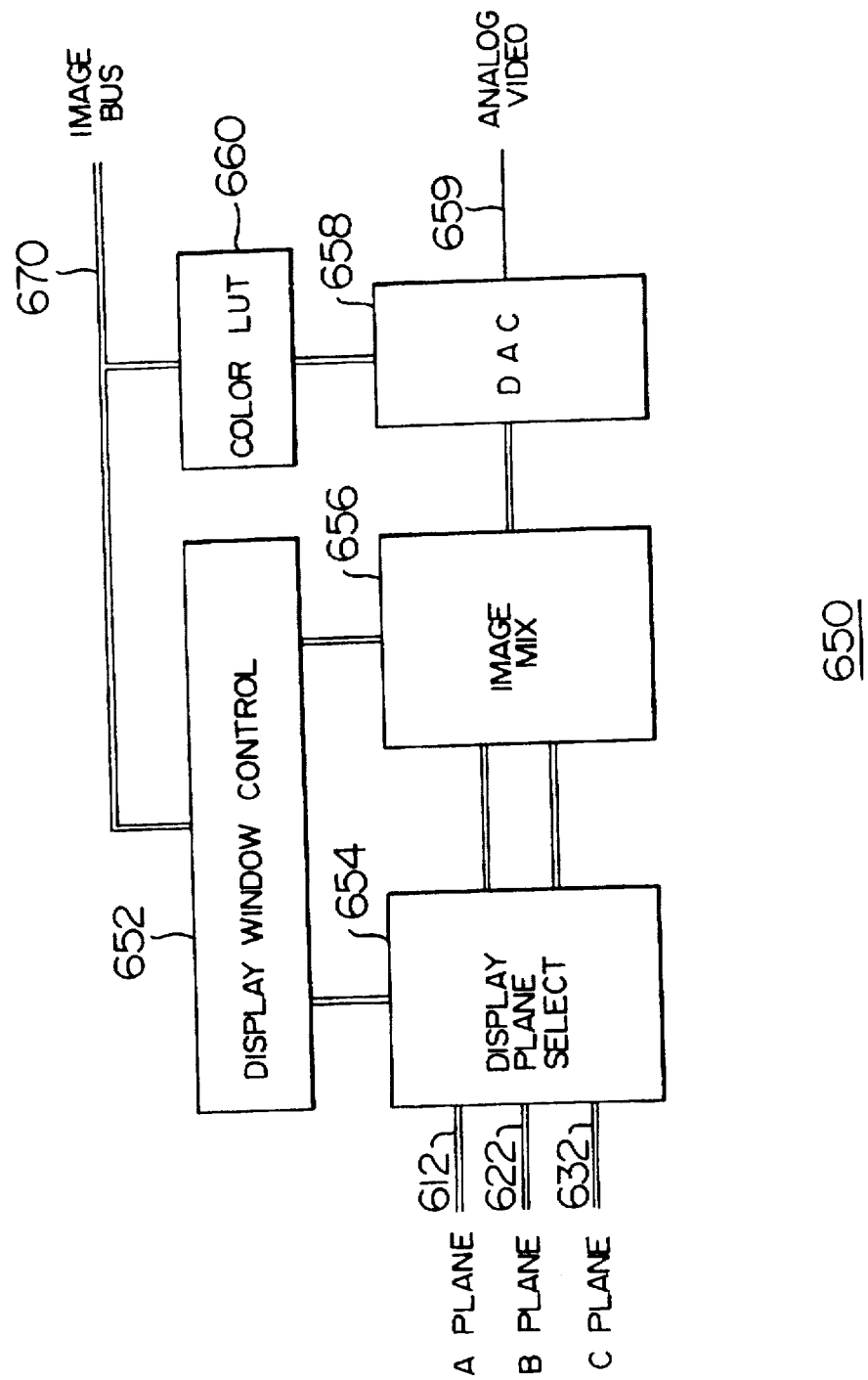
FIG. 5 is a block diagram showing a circuit construction of a video processor which is used in the system of FIG. 1.

FIG. 5 is a block diagram showing a specific circuit construction of the video processor 650.

The video processor 650 has a display window controller 652, a display plane selector 654, an image mixer 656, a D/A converter 658, and a color lookup table (LUT) 660.

The operation of the video processor 650 is controlled by the image processing program stored in the main memory 220 in the computer main body 200.

The image data in the image memories 610, 620, and 630 is transferred to the display plane selector 654 through dedicated signal lines 612, 622, and 632, respectively. The display plane selector 654 selects two display planes from three display planes and transfers as image data P and Q to the image mixer 656. In this instance, the display window controller 652 designates a display region of the display plane by control data 670 which is generated by the image processing program of the computer main body 200 and is sent through the system bus 150, image memory read/write controller 520, and image bus 550. By designating the display region by the display window controller 652, a roll function to continuously switch the display plane can be realized.

The roll function to switch the display plane has been described above. A dissolve function as another display plane switching function will now be described.

The image mixer 656 mixes the image data P and Q which are inputted and forms image data X by the following equation.

$$X=P \bullet a + Q(1-a)$$

The display window controller 652 changes the value of a between 0 and 1 at a timing which is instructed by the control data 670.

The mixed image data X is converted to the analog video signal 659 by the D/A converter 658 and displayed by the large screen projection display 700.

In this instance, in a state in which the value of a is equal to 1, X=P and the image P is displayed. However, when a is decreased from 1 to 0, a luminance of the image P decreases and a luminance of the image Q increases. By such an operation, the image P fades out and the image Q fades in, so that the image is continuously switched and the dissolve function can be accomplished.

The color lookup table 660 sends a color tone parameter of a display color to the D/A converter 658 and accomplishes a full color display of a good color tone.

The image processing unit 500 as a main component element of the invention has been described in detail above. The following effects are obtained in cooperation with the computer system 100.

The image memory 610 is connected to the video processor 650 through the dedicated signal line 612. The image memory 620 is connected to the video processor 650 through the dedicated signal line 622. Similarly, the image memory 630 is connected to the video processor 650 through the dedicated signal line 632. For example, each of the signal lines 612, 622, and 632 has a transfer rate of 480 MB/S that is eight times as high as a transfer rate of the image bus 550 and can transfer the data in each of the image memories 610, 620, and 630 to the video processor 650 in parallel with an access from the image bus 550 side.

The video processor 650 converts the digital data of the image which is sent from each image memory to the analog data and displays on the large screen projection display 700.

The above description relates to the case where an image software is previously prepared by another system.

A process to form image data by using the image scanner 330 in FIG. 1 which is provided for the image display apparatus will now be described.

The image scanner 330 inputs the original image supplies and stores into the image memories 610, 620, and 630 through the compression/expansion unit 510. In such a process, the compression/expansion unit 510 allows the image data to pass as it is and does not execute the compression and expansion of the data. The inputted image data is confirmed by the operator on the large screen projection display 700. After that, it is compressed by the compression/expansion unit 510 and is recorded into a magneto-optical disk prepared in the magneto-optical disk drive (MO disk drive) 300 through the system bus 150. The above operation is controlled by the image processing program stored in the main memory 220 in the computer main body 200. On the basis of the image data from the image memories, processes for eliminating wrinkles, scratches, stain, or the like can be performed as necessary by the image processing program. Further, a software compressing function of the image processing program can be also used without using the compressing function of the compression/expansion unit 510. In such a case, the image data from the image memories is allowed to pass through the compression/expansion unit 510 as it is and is sent to the computer main body 200 via the system bus 150. The image data processed by the computer main body 200 is sent to the MO disk drive 300 via the system bus 150. The image data recorded as mentioned above has data contents similar to the data contents of the image file shown in FIG. 3.

The magneto-optical disk formed by the above processes is loaded into the MO disk drive 300, so that the image data is read out from the disk. The image data is transmitted via the interface 310 and system bus 150 which are provided for the computer system 100 and is supplied to the compression/ expansion unit 510, image bus 550, image memories 610, 620, and 630, dedicated signal lines 612, 622, and 632, and video processor 650 which are provided for the image processing unit 500. The image data is displayed on the large screen projection display 700.

In the above-described embodiment, image data and scenario data (control data) are recorded in a magneto-optical disk. Alternatively, image data and scenario data (control data) may be recorded in a CD-ROM and read out from the CD-ROM drive 360. Further, the image data and scenario data (control data) recorded in the magneto-optical disk may be copied into the magnetic disk 260 and read from the magnetic disk 260.

Figure 6:
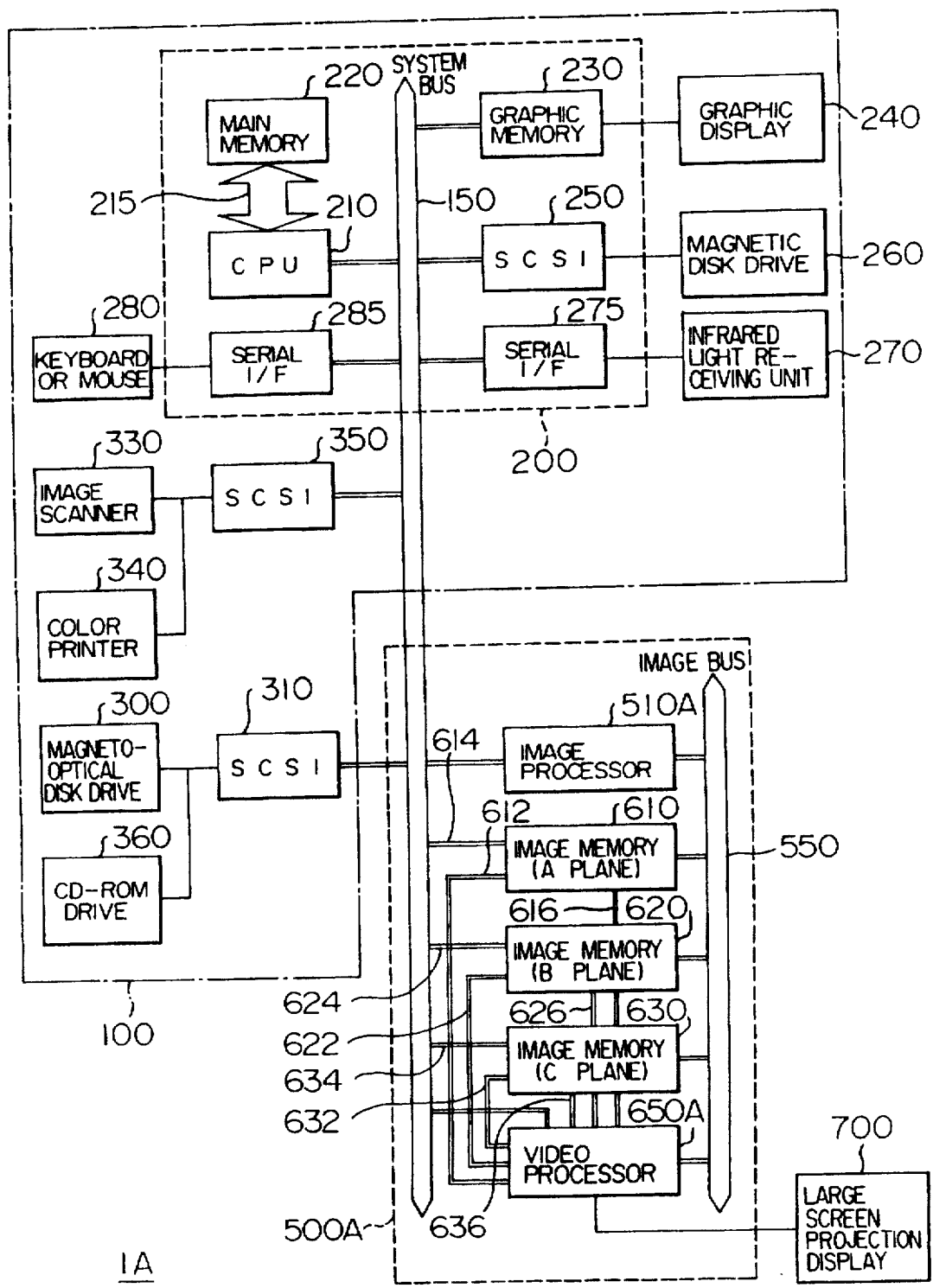
FIG. 6 is a block diagram showing a system construction of another embodiment of an image display apparatus of the invention.

FIG. 6 is a block diagram showing another embodiment of an image display apparatus of the invention.

An image display apparatus 1A differs from the image display apparatus 1 of FIG. 1 with respect to the following construction and effects.

(1) The compression/expansion unit 510 and image memory read/write controller 520 are replaced with a programmable image processor 510A. The video processor 650 is replaced with a programmable video processor 650A. Further, although the display addresses which are given to the image memories 610, 620, and 630 are supplied from the image memory read/write controller 520 via the signal lines 541, 542, and 543, they are supplied from the video processor 650A via signal lines 616, 626, and 636. Thus, by changing an image processing procedure of the image processor 510A by means of the CPU 210, a plurality of compressing/expanding operations of different processing algorithms can be executed or the image memory reading/writing processes can be dynamically changed.

(2) Signal lines 614, 624, and 634 for directly accessing from the system bus 150 are provided for the image memories 610, 620, and 630 so that the image memories are arranged in the same address space as that of the main memory 220. Thus, the image memories 610, 620, and 630 can be used from the CPU 210 in a manner similar to the case of the main memory 220. By virtue of this, the image data in each image memory can be directly changed. Further, a memory area in which no image data is stored can be used for other purposes.

Figure 7:
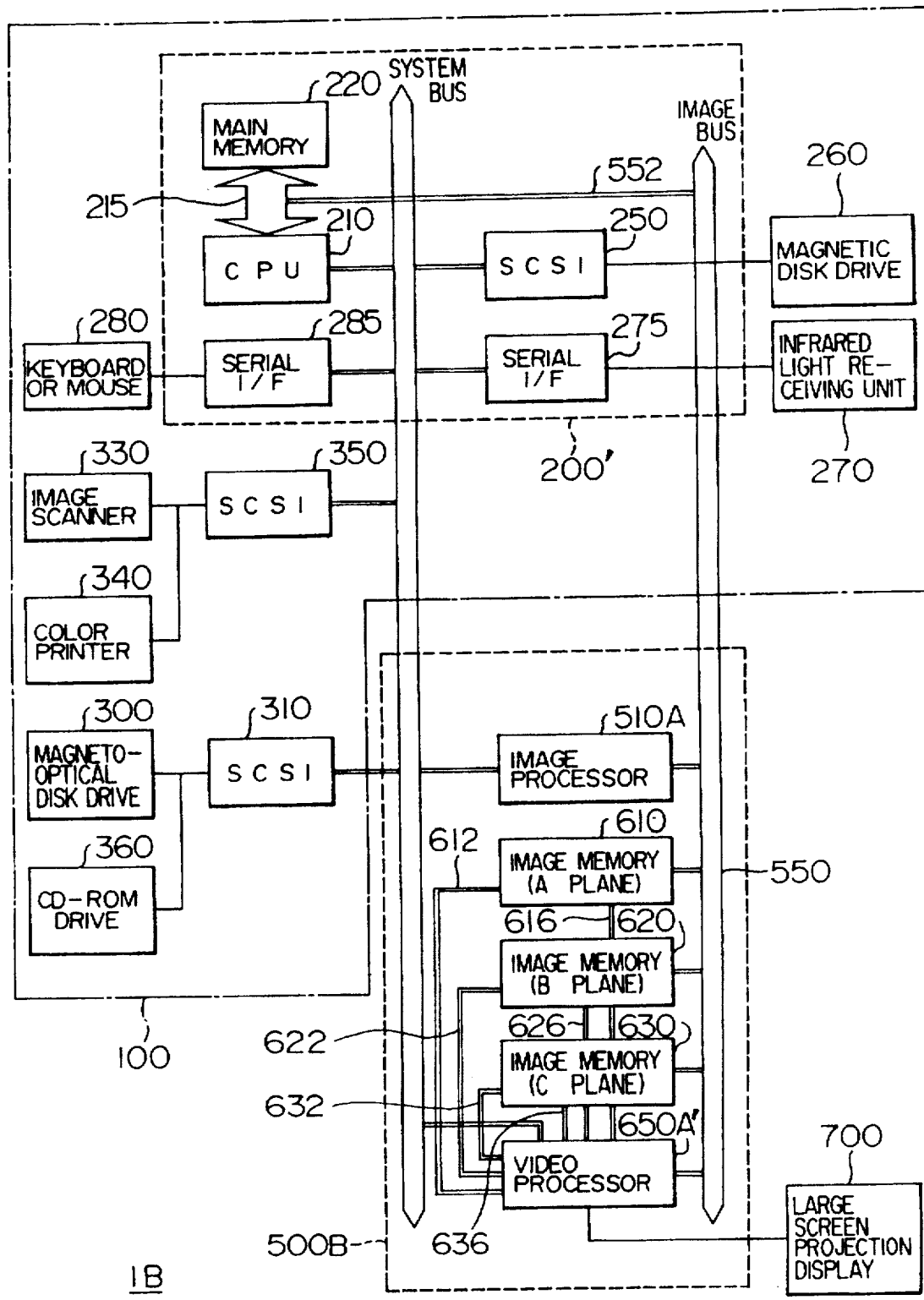
FIG. 7 is a block diagram showing a system construction of further another embodiment of an image display apparatus of the invention.

FIG. 7 is a block diagram showing still another embodiment of an image display apparatus of the invention.

An image display apparatus 1B differs from the image display apparatus 1 of FIG. 1 with respect to the following construction.

(1) A signal line 552 to connect a high-speed memory bus 215 which in turn connects the CPU 210 of the computer and the main memory 220 and the image bus 550 is provided. Since the signal line 552 and the image bus 550 are also the high-speed lines, a signal transfer path of the memory bus 215, signal line 552, and image bus 550 has a high-speed data transfer rate as a whole.

(2) By commonly using the large screen projection display 700 as a graphic display, the graphic display 240 in FIGS. 1 and 6 is eliminated in a computer main body 200'. The function of the graphic display 240 is realized by the large screen projection display 700. A slave display plane of the graphic display 240 is displayed or the like in the display plane of the large screen projection display 700.

(3) In the embodiment of FIG. 1, the display addresses which are given to the image memories 610, 620, and 630 are supplied from the image memory read/write controller 520. In this embodiment, however, the display addresses are supplied from a video processor 650A' through the signal lines 616, 626, and 636. (Note that the video processor 650A' is connected to the memory bus 215 through the image bus 550 and signal line 552). With the arrangement, the image memories can be arranged in the same address space as that of the main memory 220 of the computer.

By virtue of the above construction, in the case where the image memories are used as expansion memories of the main memory or the like, the high-speed access can be performed for the image memories. The displays can be centralized to one display, so that an operability of the user is improved and a cost-performance ratio is improved.

A method of using the image display apparatus of the invention will now be described with reference to FIGS. 1 and 3.

When the image processing program is loaded into the computer main body 200', an initial display plane is displayed on the large screen projection display 700. Therefore, a resolution (for example, 1280×1024 dots) of the large screen projection display 700, whether the standard is an HVC (hi-vision promotion center) standard or not, automode, interactive mode, and the like are designated by the operator.

First, the interactive mode will be described. When an interactive mode is designated on the initial display plane, menu display data 867 shown in FIG. 3 is read out from the magneto-optical disk loaded in the magneto-optical disk drive 300 and a menu is displayed on the large screen projection display 700.

From the above menu, an instruction is sent to the infrared light receiving unit 270 by means of a remote control unit (not shown) and a scenario to decide which one of the kinds such as Ukiyoe (a picture of everyday life in old Japan), landscape painting, ancient document, and the like is displayed is selected. By the above selection, the scenario data 866 is read out from the magneto-optical disk and the image data corresponding to the scenario data is stored in the image memories 610, 620, and 630. The image data is displayed to the large screen projection display 700 by the video processor 650. Simultaneously with the scenario selection, the audio data corresponding to the image data is read out from a CD-ROM set in the CD-ROM apparatus 360 and an audio sound is generated from a loud speaker (not shown) through an amplifier (not shown). One scenario has a plurality of image data and can sequentially switch and display the screen by the operation of a remote control unit.

The auto-mode will now be described.

When the auto-mode is selected on the initial display plane, the scenario data (control data) 866 is read out from the magneto-optical disk shown in FIG. 3 and the corresponding image data is stored in the image memories 610, 620, and 630 on the basis of the scenario data 866. The image data is displayed on the large screen projection display 700 by the video processor 650. Simultaneously with the scenario selection, the audio data corresponding to the image data is read out from the CD-ROM set in the CD-ROM apparatus 360 and an audio sound is generated from the loud speaker (not shown) through the amplifier (not shown). One scenario has a plurality of image data and can automatically sequentially switch and display the screen in accordance with a reproduction sequence of the scenario data.

In case of loading an ordinary application program without loading the image processing program into the computer main body 200, the image display apparatus 1B obviously operates as an ordinary PC basic system and the whole image memories can be used as expansion memories of the main memory 220.

When the image file 860 is created, the scenario data 866 is recorded on the magneto-optical disk together with the image data 861 to 865 as shown in FIG. 3.

As described in detail above, since the image bus as a dedicated bus which can transfer data at a high speed and, further, signal lines which can read out data from the image memories at a high speed are independently arranged on the system bus as a standard input/output bus of a PC basic system of a relatively slow data transfer speed, the image display apparatus of the invention has the following effects.

(1) The compressed image data and its expanded image data do not commonly use the system bus. The compressed image data uses the system bus, while the expanded image data uses the dedicated image bus. Therefore, a data transfer rate of the image display is improved and the processes can be executed at a high speed.

(2) Since a small computer such as a PC or the like and the image processor are installed in the same casing, a signal transfer delay can be reduced and the image display apparatus of a high cost-performance ratio can be obtained.

(3) Since the image memories can be used as expansion memories of the main memory of the small computer, the memory use efficiency is improved and the image display apparatus of a high cost-performance ratio can be obtained.

(4) The personal computer or the like as a general computer is used as a base machine of the image display apparatus and peripheral equipment such as magneto-optical disk drive, CD-ROM apparatus, image scanner, and the like are connected to the base machine side. Therefore, a creation and a change of a control software in the image processing unit which are usually required in association with the improvement of the performances of the peripheral equipment or the like, are unnecessary.

Figure 9:
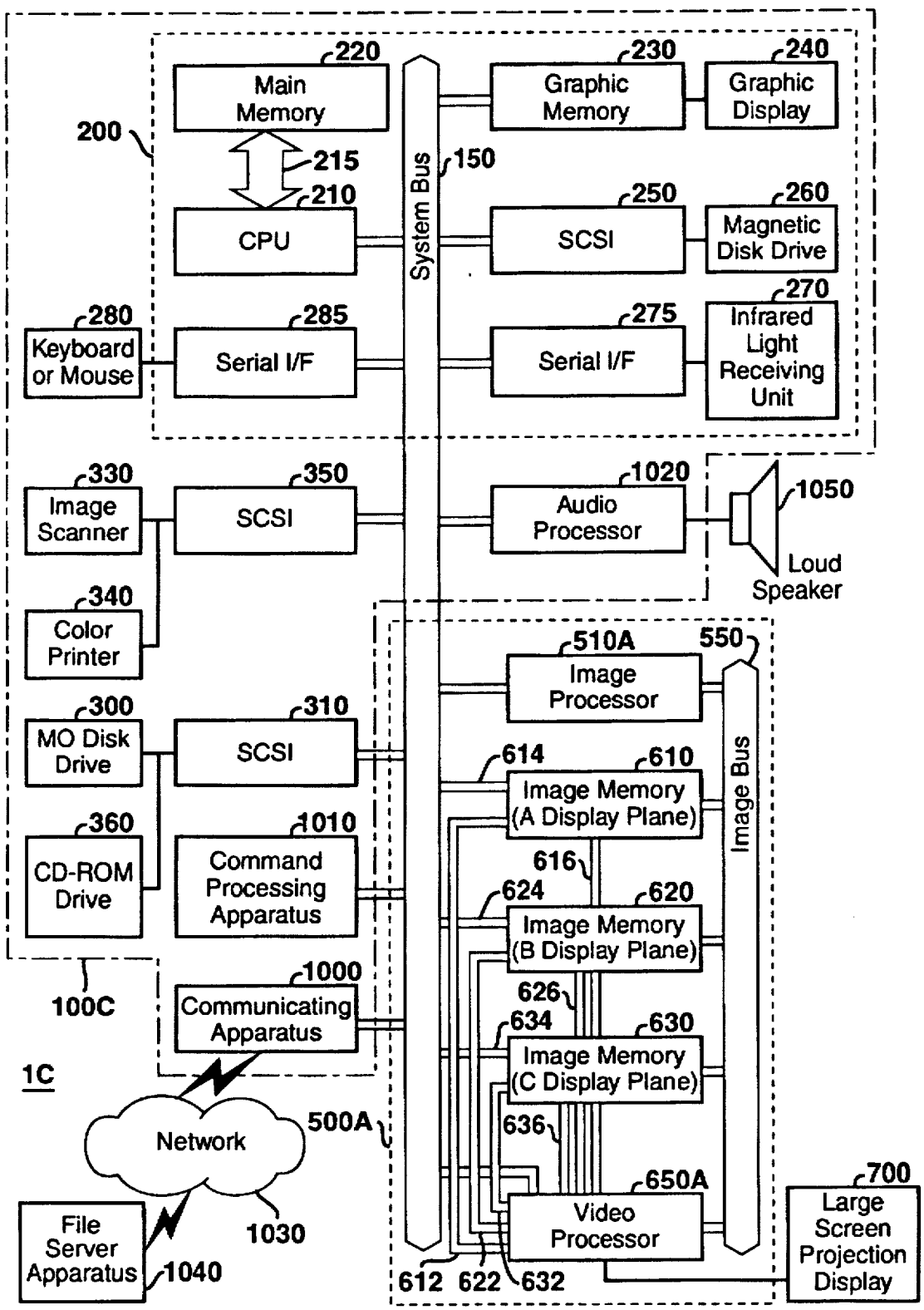
FIG. 9 is a block diagram showing another embodiment of an image display apparatus of the invention.

FIG. 9 is a block diagram showing another embodiment of an image display apparatus of the invention. An image display apparatus 1C according to the embodiment differs from the image display apparatus 1A in FIG. 6 with respect to the following construction, operation, and effect.

There is a different construction such that a communicating apparatus 1000, a command processing apparatus 1010, and an audio processor 1020 are newly added to the system bus 150 of the computer system 1000 in FIG. 1 or 6. Further, the communicating apparatus 1000 is connected to a file server apparatus 1040 through a network 1030.

The network 1030 is a communication network to interconnect a plurality of computer apparatuses. By adding a unique address (hereinafter, referred to as a network ID) to each computer apparatus to manage the computer apparatuses, data transmission and reception among the computer apparatuses are enabled. As standard guidelines of the network, there are Ethernet, FDDI (Fiber Distributed Data InterFace), and ATM (Asynchronous Transfer Mode). As a communication protocol, TCP/IP or the like is known. When the number of apparatuses which are connected to the network 1030 is small or it is sufficient that a communication capacity is small, the network can be also constructed by using RS-232C, a modem, or the like.

When receiving the network ID and data to be sent to a transmission destination, the communicating apparatus 1000 transmits the data in accordance with a network protocol for the network 1030. Conversely, when data along with the same network ID as that of the communicating apparatus destined to the communication apparatus 1000 is received by the network 1030, the received data is restored to the original data in accordance with the network protocol for the network 1030 and is transferred to the command processing apparatus 1010, an image processor 510A, and the audio processor 1020.

The command processing apparatus 1010 interprets an input from the keyboard or mouse 280 and a command input from the communicating apparatus 1000 and controls the image processor 510A, a video processor 650A, the communicating apparatus 1000, and the audio processor 1020 to execute the inputted command. Further, the command processing apparatus 1010 reads programmed control data (hereinafter, referred to as a scenario), obtained by combining a plurality of commands, and sequentially interprets and executes each command in the scenario, thereby enabling a series of operations of the image display apparatus 1C to be controlled by the scenario. FIG. 10 shows an example of control commands of the image display apparatus 1C. The operation of each command will be explained hereinlater.

Figure 11:
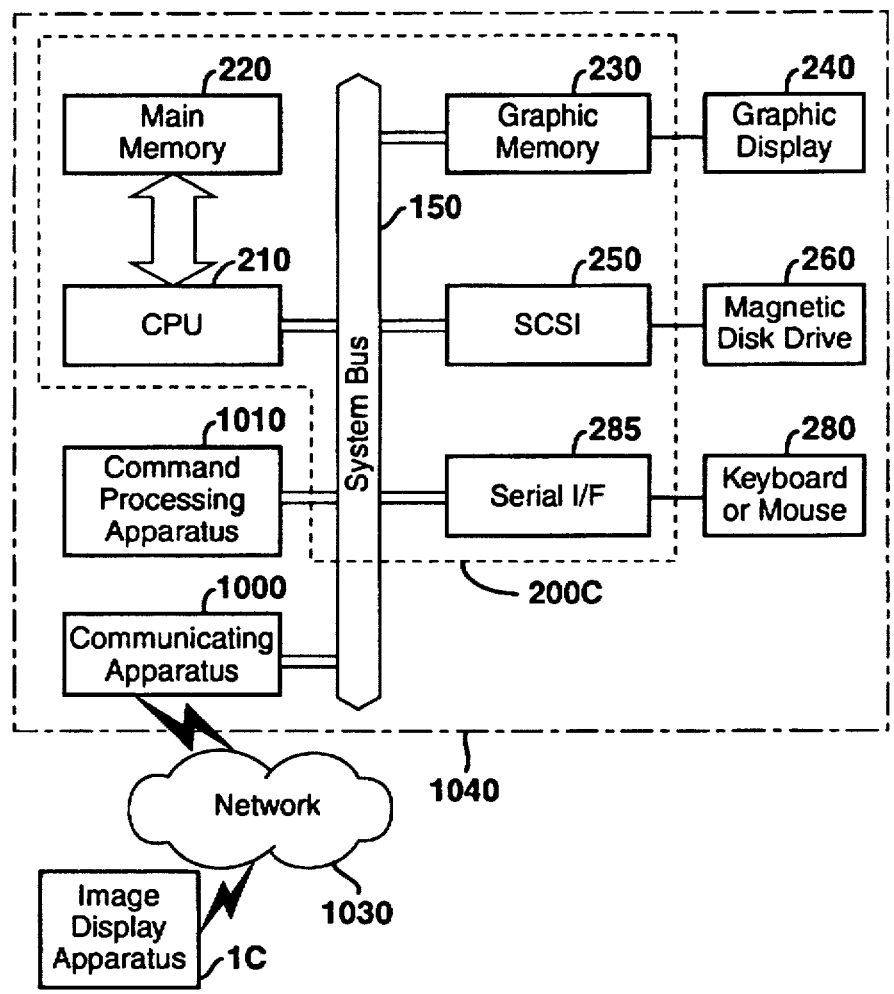
FIG. 11 shows a construction of the file server apparatus 1040.

A construction of the file server apparatus 1040 is shown in FIG. 11. The file server apparatus 1040 is made up of a personal computer 200C, communicating apparatus 1000, and command processing apparatus 1010. The personal computer 200C is obtained by removing the serial I/F 275 and infrared light receiving unit 270 from the computer main body 200 in FIG. 1 or 6. The command processing apparatus 1010 interprets and executes commands (C19, C20, C21, C22, C23, etc.) regarding the file operation shown in FIG. 10. Images, audio data, and scenario data have been recorded as files on the magnetic disk drive 260 of the file server apparatus 1040. When the command for file transmission C20 is received from the image display apparatus 1C, the designated file is read out from the magnetic disk drive 260 and is transmitted to the image display apparatus 1C. When the command for file writing C19 is received from the image display apparatus 1C, the transmitted data is recorded as a file onto the magnetic disk drive 260. Further, when the media report C21, directory report C22, and file report C23 are received from the image display apparatus 1C, drive information, directory information, and file information of the magnetic disk drive 260 are reported. The file server apparatus 1040 executes the above operations in response to the commands sent from the image display apparatus 1C, so that the file server apparatus 1040 can be handled by the image display apparatus 1C in a manner similar to a file recording apparatus such as an MO disk drive 300 or the like built in the file server apparatus 1040 connected to the network 1030.

As described above, since in the image display apparatus 1C are installed the communicating apparatus 1000, command processing apparatus 1010, audio processor 1020, and the like, the following effects are realized.

(1) Files such as images, audio data, scenario, etc. of another apparatus such as a file server apparatus 1040 or the like which is connected to the network 1030 and which has the communicating apparatus 1000 and command processing apparatus 1010 are freely taken out and can be executed and reproduced by the image display apparatus 1 C.

(2) By transmitting a command or scenario from another apparatus which is connected to the network 1030 and which has the communicating apparatus 1000 and command processing apparatus 1010, the operation and function of the image display apparatus 1C can be controlled and used.

Figure 12:
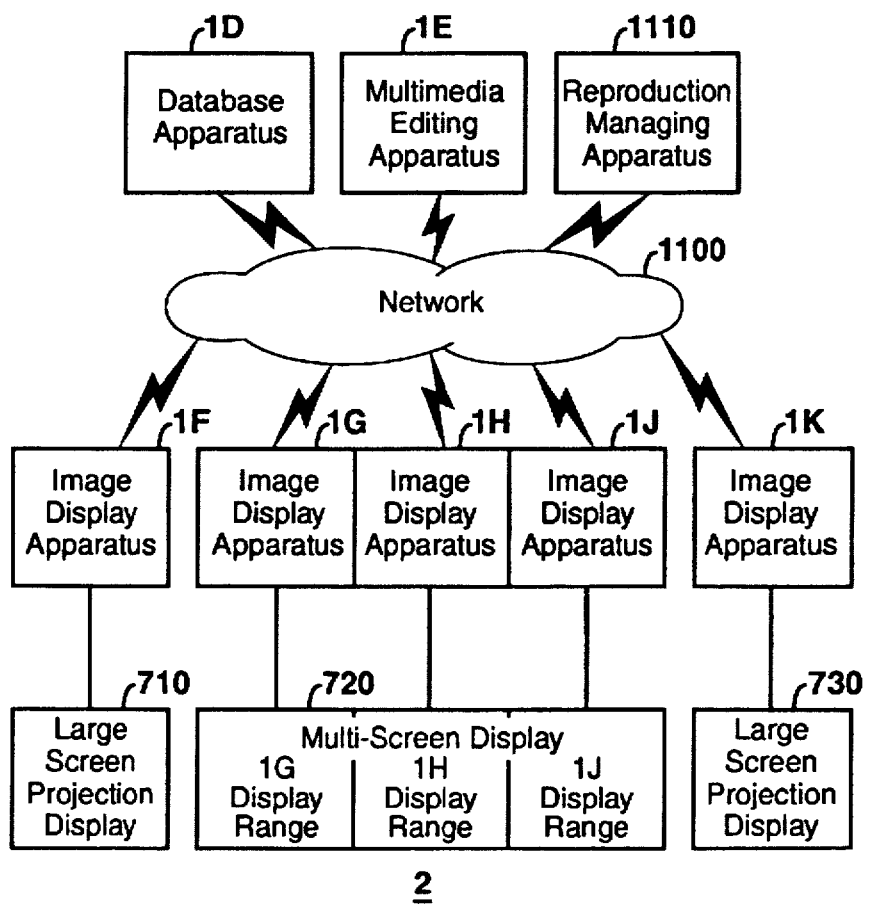
FIG. 12 shows a multimedia network system 2 for performing the operation of a database in which images, audio data, and scenarios have been stored and the reproduction and management of the images, audio data, and scenarios by using the image display apparatuses according to the invention.

An embodiment in the case where a plurality of image display apparatuses according to the invention are connected to the network and used is shown in FIG. 12.

FIG. 12 shows a multimedia network system 2 for performing the operation of a database in which images, audio data, and scenarios have been stored and the reproduction and management of the images, audio data, and scenarios by using the image display apparatuses according to the invention. A network 1100 is a network equivalent to the network 1030 in FIG. 9. A database apparatus 1D and a multimedia editing apparatus 1E each are realized by adding a database process and a multimedia editing process to the image display apparatus 1C in FIG. 9. Image display apparatuses 1F, 1G, 1H, 1J, and 1K are image display apparatuses equivalent to the image display apparatus. 1C shown in FIG. 9. A reproduction managing apparatus 1110 is realized by adding a reproduction managing process to the file server apparatus 1040 in FIG. 11. Large screen displays 710 and 730 are large screen projection displays equivalent to the large screen projection display 700 in FIG. 1 or 6. A multi screen display 720 is a multi screen display in which the three large screen displays 700 are connected and displays display signals of the image display apparatuses 1G, 1H, and 1J into display ranges of 1G, 1H, and 1J, respectively.

Figure 13:
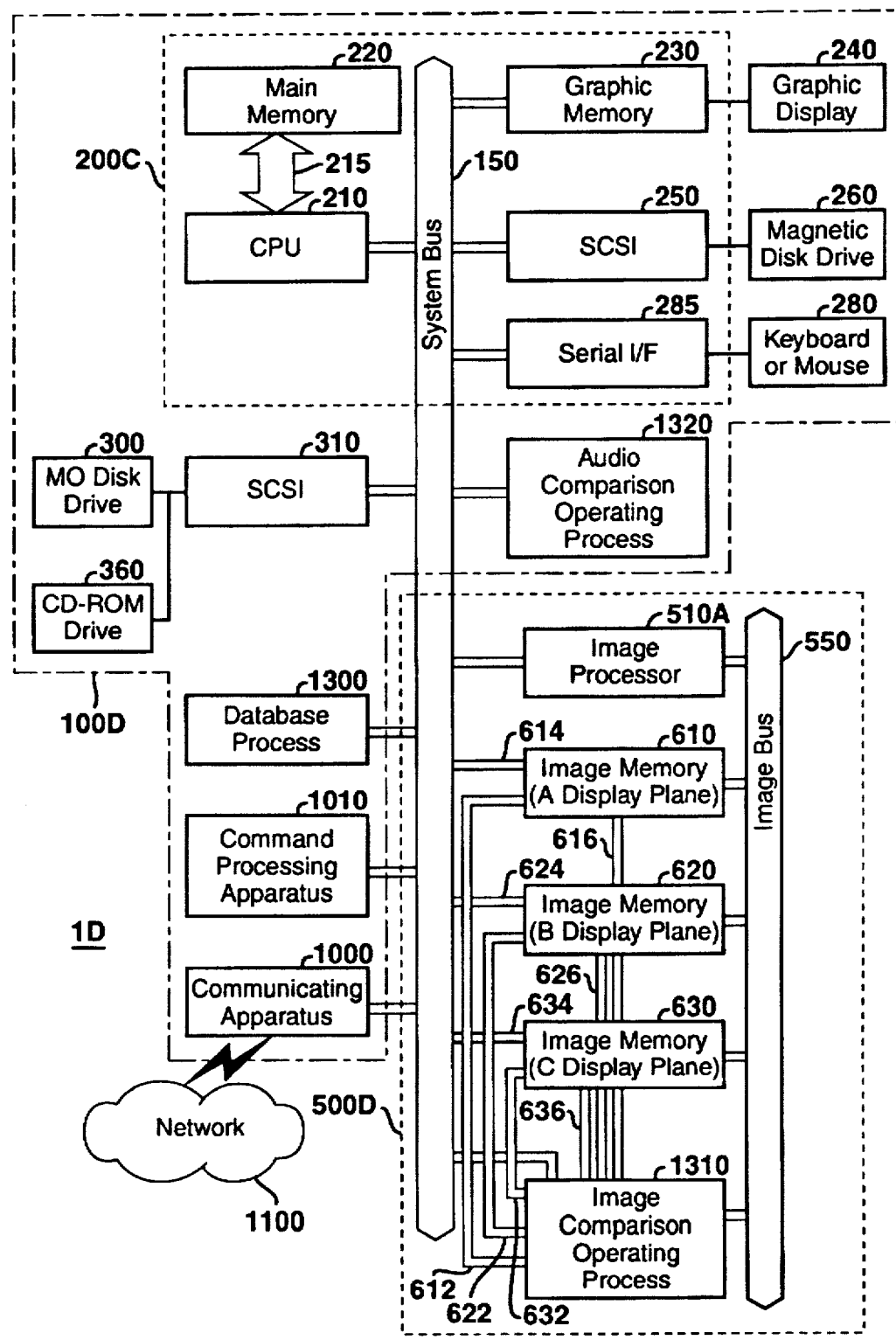
FIG. 13 is a block diagram in which a database process is added to the image display apparatus 1C in FIG. 9.

FIG. 13 is a block diagram in which a database process is added to the image display apparatus 1C in FIG. 9. The database apparatus 1D differs from the image display apparatus 1C in FIG. 9 with respect to the following construction, operation, and effect.

The different construction is that a database process 1300 is newly added to the system bus 150 of the personal computer system 100C in FIG. 9 and the video processor 650A and the audio processor 1020 are replaced with an image comparison operating processor 1310 for performing a comparison operating process to the image data in the image memories 610, 620, and 630 and a audio comparison operating processor 1320 for performing a comparing operation to the audio data. The SCSI 350, image scanner 330, and color printer 340 are deleted from the personal computer system 100C.

Figure 14:
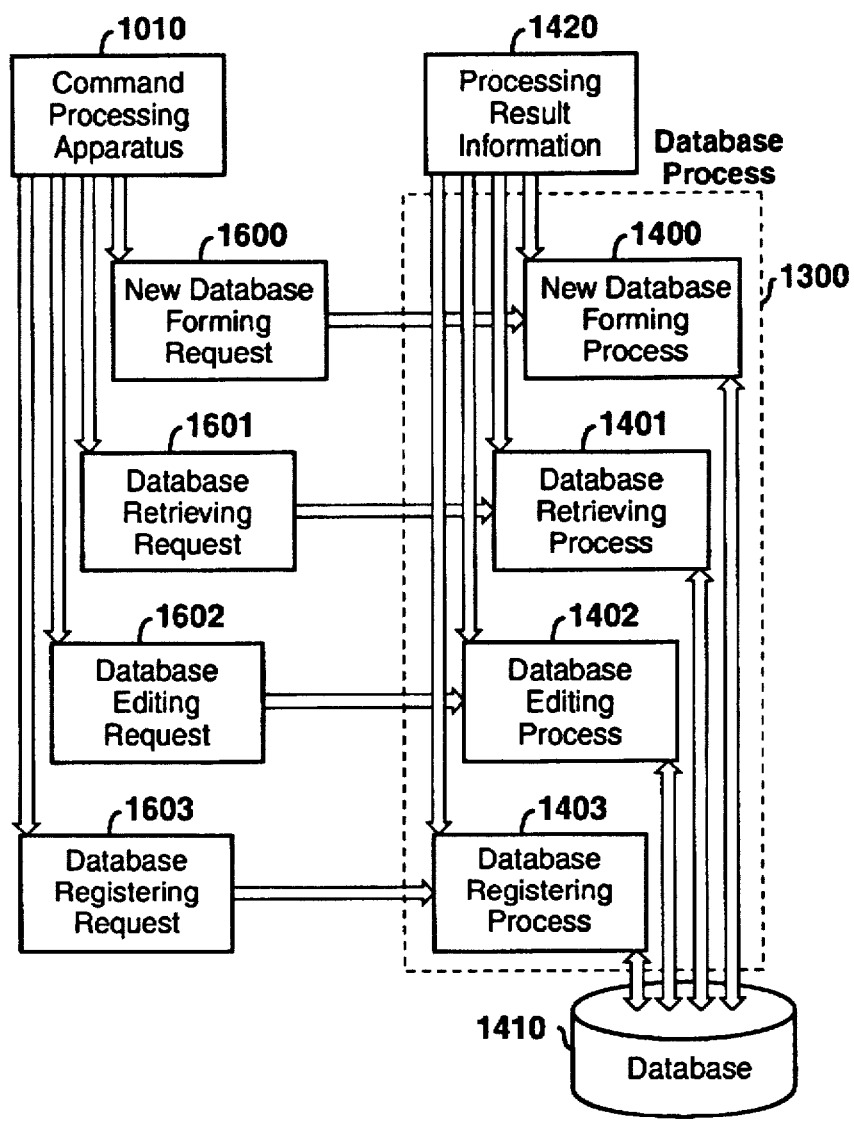
FIG. 14 shows an example of the operation of the database process 1300.

The operation of the database process 1300 will now be described with reference to FIG. 14. When the commands received by the communicating apparatus 1000 are commands regarding a new database formation C24, a database retrieval C25, a database edition C26, and a database registration C27, the command processing apparatus 1010 generates a new database forming request 1600, a database retrieving request 1601, a database editing request 1602, and a database registering request 1603 to the database process 1300, respectively. When receiving the new database forming request 1600, database retrieving request 1601, database editing request 1602, and database registering request 1603, the database process 1300 executes a new database forming process 1400, a database retrieving process 1401, a database editing process 1402, and a database registering process 1403, respectively, and returns execution results as processing result information 1420 to the command processing apparatus 1010. The operations of processes which are executed in the database process 1300 will now be described hereinbelow.

(1) The new database forming process 1400 forms a new empty database 1410 onto the magnetic disk drive 260 and returns the result.

(2) When the given retrieving condition indicates images, the database retrieving process 1401 executes an image process such as expansion, conversion, or the like to the given images by an image processor 510A in accordance with an image format and a retrieving method and writes the processed images into the image memory 610. Further, the images as retrieving targets are read out from the database 1410 and are subjected to an image process such as expansion, conversion, or the like by the image processor 510A in accordance with an image format and a retrieving method. The processed images are sequentially written into the empty image memories 620 and 630. Subsequently, the image comparison operating processor 1310 executes a comparison operating process such as pixel comparison, pattern matching, distance calculation or the like between an image serving as a retrieving condition and the images read out from the database 1410, thereby discriminating whether they are matched with the retrieving condition or not and returning a discrimination result. When the given retrieving condition denotes audio data, audio data given is transferred to the audio comparison operating processor 1320, the audio data as retrieving targets is subsequently read out from the database 1410 and sequentially transferred to the audio comparison operating processor 1320. The audio comparison operating processor 1320 compares the transferred audio data serving as a retrieving condition and the audio data read out from the database 1410, thereby discriminating whether they are matched with the retrieving condition or not and returning the discriminating result. When the given retrieving condition denotes a text, the retrieving condition is compared with the text or scenario as a retrieving target in the database 1410 by a text comparing process (not shown), thereby discriminating whether they are matched with the retrieving condition or not and returning a discrimination result. It is assumed here that the scenario is described by a text.

(3) The database editing process 1402 edits and reconstructs the database 1410 in accordance with given editing conditions and returns an edition result.

(4) The database registering process 1403 registers data such as images, audio data, scenarios, etc. into the database 1410 in accordance with registering conditions. When the data has already been registered, a change attribute is verified and, after that, if a change is possible, the data is changed and a result is returned.

By programming the image processor 510A in a manner such that not only the image process but also an audio process, a text process, and the like are programmed and the processed data is written into the image memories 610, 620, and 630 and the image comparison operating processors 1310 can compare the audio data or text data, it is also possible to allow an image processing section 500D to execute a retrieving process of multimedia data such as images, audio, scenario, or the like. In this case, the audio comparison operating processor 1320 is unnecessary.

As described above, since in the image display apparatus 1 C are installed the database process 1300, image comparison operating processor 1310, audio comparison operating processor 1320, and the like, the following effects are realized.

(1) From another apparatus which is connected to the network 1100 and which has the communicating apparatus 1000 and command processing apparatus 1010, it is possible to form, retrieve, edit, and register the database as if the database 1410 existed in the own apparatus.

(2) Since a plurality of image memories are used, the retrieval can be progressed at a high speed by reading out another image while two images are compared. Two or more images can be simultaneously compared.

(3) Since it is possible to retrieve as it is by using the compressed images, a load on the network and a size of database can be reduced.

Figure 15:
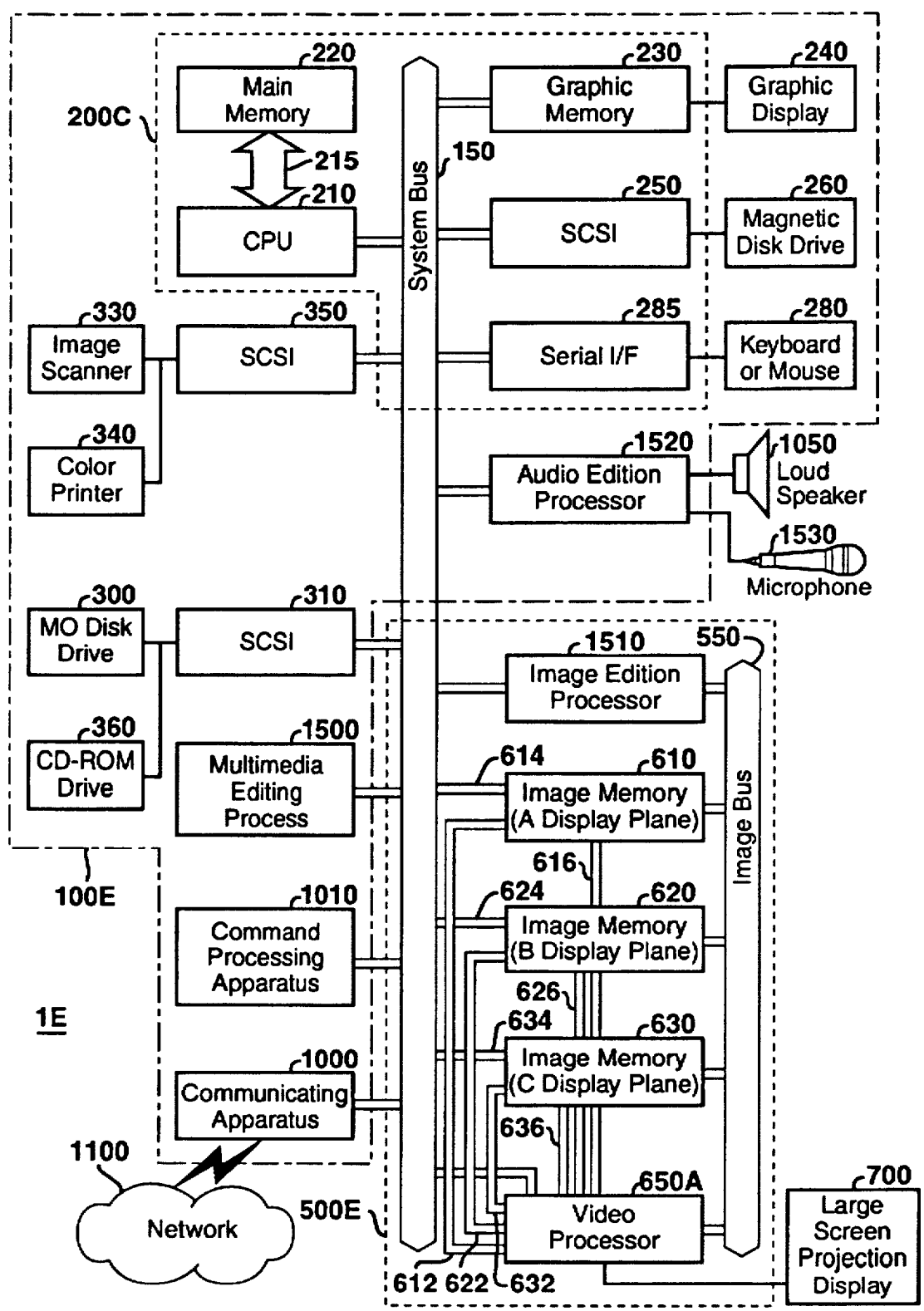
FIG. 15 is a block diagram in which a multimedia editing process is added to the image display apparatus 1C in FIG. 9.

FIG. 15 is a block diagram in which a multimedia editing process is added to the image display apparatus 1C in FIG. 9. The multimedia editing apparatus 1E differs from the image display apparatus 1C in FIG. 9 with respect to the following construction, operation, and effects.

The different construction is that a multimedia editing process 1500 is newly added to the system bus 150 of the personal computer system 100C in FIG. 9 and the video processor 650A and audio processor 1020 are replaced with an image edition processor 1510 for editing the image data in the image memories 610, 620, and 630 and an audio edition processor 1520 for editing the audio data. Further, a microphone 1530 to input voice or audio data is added to the audio edition processor 1520.

Figure 16:
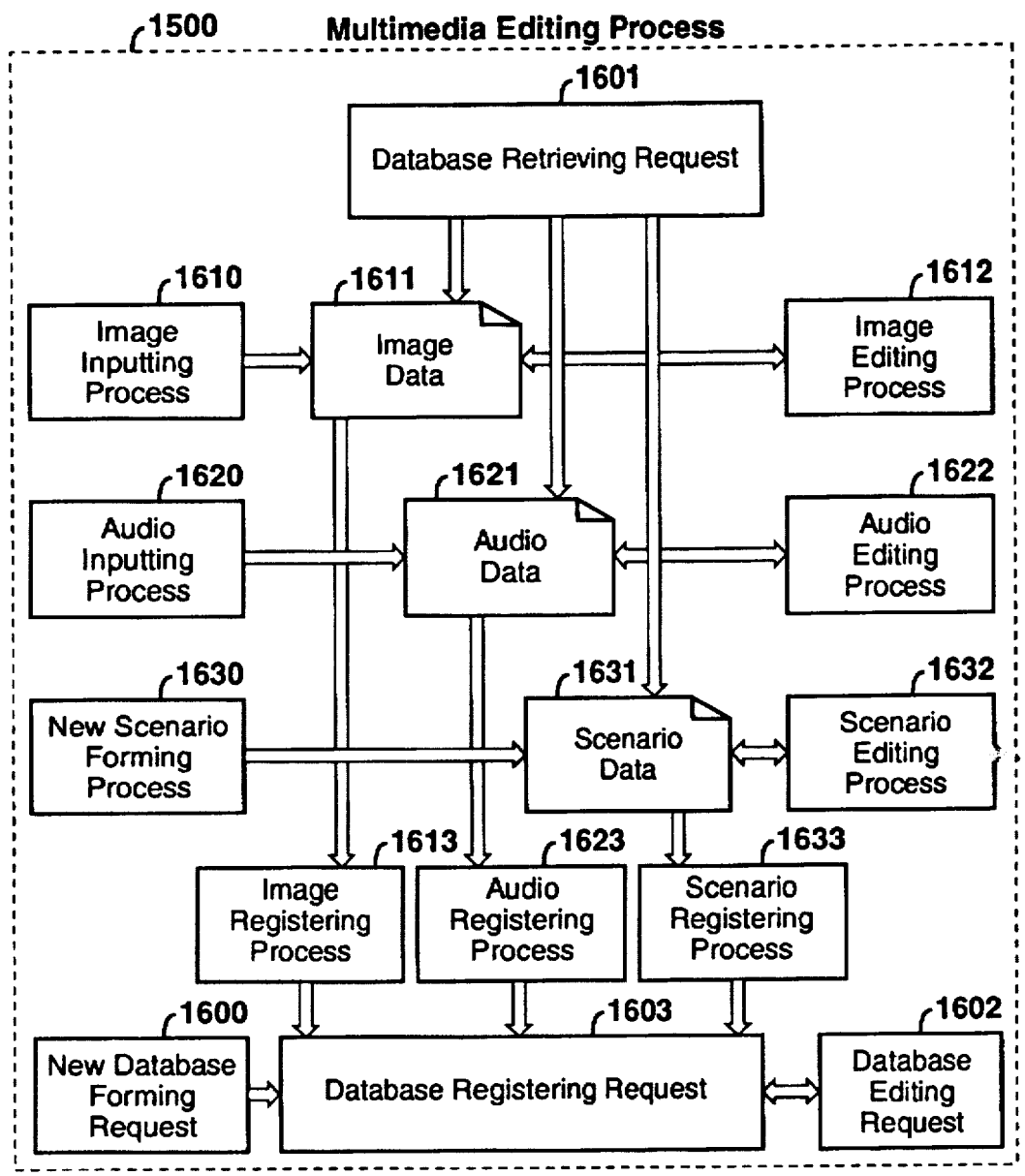
FIG. 16 shows an example of the operation of the multimedia editing process 1500.

The operation of the multimedia editing process 1500 will now be described with reference to FIG. 16. The operator gives an instruction to the multimedia editing process by using the keyboard or mouse 280. The multimedia editing apparatus 1500 discriminates the instruction of the operator sent via the serial I/F 285 and executes the following processes.

(1) When a new image is inputted, edited, and registered, the operator sets an original such as a photograph or the like into the image scanner 330 and executes an image inputting operation. When receiving an image inputting instruction, the multimedia editing apparatus 1500 reads the original set in the image scanner 330 by an image inputting process 1610 and writes the read original image into one of the image memories 610, 620, and 630 which is not used. When the operator subsequently performs an image editing operation, an image editing process 1612 controls the image edition processor 1510 and executes an image editing process such as size conversion adjustment, outline enhancement, color correction, elimination of a fouling stain, or the like instructed by the operator. Finally, when the operator performs an image registering operation, retrieval information, attribute information, and the like which are necessary for image registration are added to the edited image data 1611 by an image registering process 1613. The database registering request 1603 is transmitted to the database apparatus 1D via the command processing apparatus 1010 and communicating apparatus 1000. The database apparatus 1D processes the database registering request 1603 and the edited image data 1611 is registered.

(2) When new audio data is inputted, edited, and registered, the operator executes an audio inputting operation by using the microphone 1530 or CD-ROM drive 360. When receiving an audio inputting instruction, the multimedia editing apparatus 1500 fetches audio data 1621 inputted from the microphone 1530 or CD-ROM drive 360 by an audio inputting process 1620. Subsequently, when the operator performs an audio editing operation, an audio editing process 1622 controls the audio edition processor 1520 and executes an audio editing process regarding a sound volume, a sound quality, a reproduction time, or the like instructed by the operator. Finally, when the operator performs an audio registering operation, retrieval information, attribute information, and the like which are necessary for audio registration are added to the edited audio data 1621 by an audio registering process 1623. The database registering request 1603 is transmitted to the database apparatus 1D via the command processing apparatus 1010 and communicating apparatus 1000. The database apparatus 1D processes the database registering request 1603 and the edited audio data 1621 is registered.

(3) When a new scenario is formed, edited, and registered, the operator executes a scenario editing operation by using a scenario edition display screen which is displayed on the large screen display 700 or graphic display 240. When receiving a new scenario forming instruction, the multimedia editing apparatus 1500 performs a control to display the new scenario edition display screen to a new scenario forming process 1630. The new scenario forming process 1630 displays the new scenario edition display screen. Subsequently, when the operator performs a scenario editing operation to the scenario edition display screen, a scenario editing process 1632 performs a scenario editing process. Finally, when the operator executes a scenario registering operation, information such as retrieval information, attribute information, and the like which are necessary for scenario registration is added to edited scenario data 1631 by a scenario registering process 1633 and the database registering request 1603 is transmitted to the database apparatus 1D via the command processing apparatus 1010 and communicating apparatus 1000. The database apparatus 1D processes the database registering request 1603 and the edited scenario data 1631 is registered.

(4) When editing the image, audio data, and scenario registered in the database 1410, the operator retrieves the image, audio data, or scenario to be edited by using a database retrieval display screen which is displayed on the large screen display 700 or graphic display 240. When receiving a retrieving instruction, the multimedia editing apparatus 1500 transmits the database retrieving request 1601 to the database apparatus 1D. When image data, audio data, and scenario data are received as a retrieval result from the database apparatus 1D, the corresponding image editing process 1612, audio editing process 1622, and scenario editing process 1632 start the processes and the operator executes an editing operation. Finally, when the operator performs a registering operation, the edited image data 1611, audio data 1621, and scenario data 1631 are changed and registered into the database 1410 via the image registering process 1613, audio registering process 1623, and scenario registering process 1633.

(5) When forming a database, the operator instructs to form a new database. When receiving a new database forming instruction, the multimedia editing apparatus 1500 transmits the new database forming request 1600 to the database apparatus 1D. When the new database is formed and a result is reported to the database apparatus 1D, a new database edition display screen is displayed. Further, when a database editing operation is performed to the database edition display screen, the database editing request 1602 is transmitted to the database apparatus 1D and the database is edited.

As described above, since in the multimedia editing apparatus 1E are installed the multimedia editing process 1500, image edition processor 1510, audio edition processor 1520, and the like, the following effects are realized.

(1) It is possible to operate the database 1410 of the database apparatus 1D connected to the network 1100 as if it exists in the own apparatus. Thus, an image, audio data, and scenario can be newly registered into the database 1410. Also, the images, audio data, and scenario which have already been registered can be edited.

(2) By using a plurality of image memories, the editing process among two or more images can be performed at a high speed.

Figure 17:
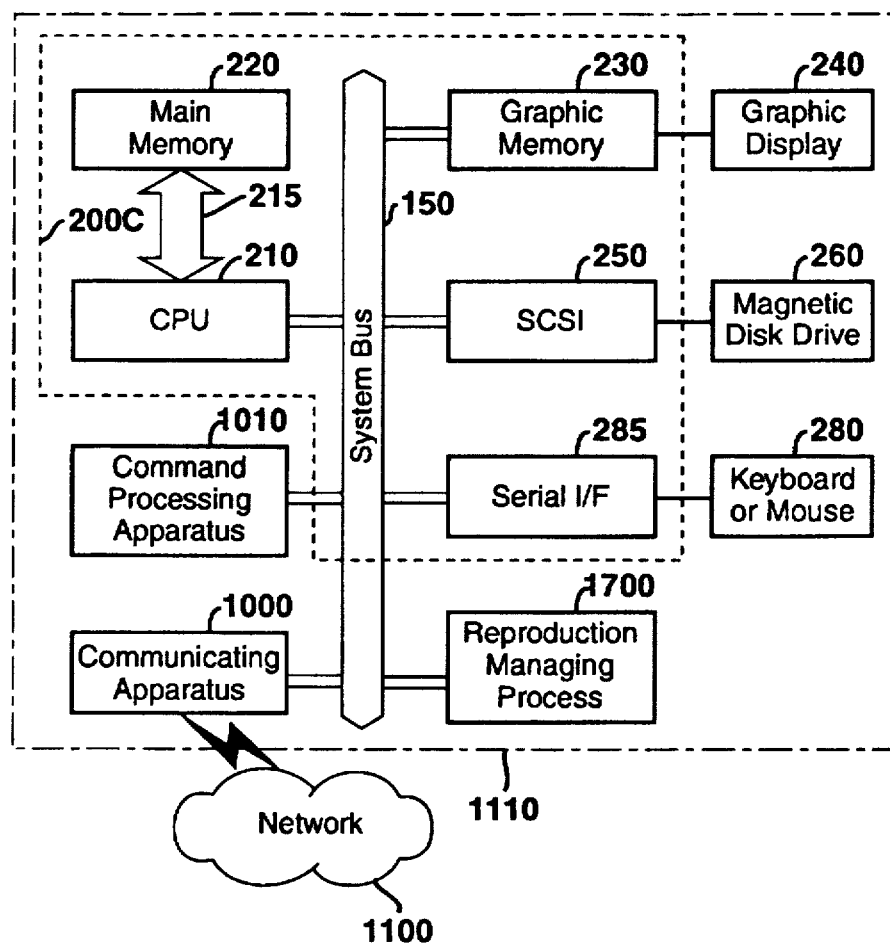
FIG. 17 is a block diagram in which a reproduction managing process 1700 is added to the file server apparatus 1040 in FIG. 11.
Figure 18:
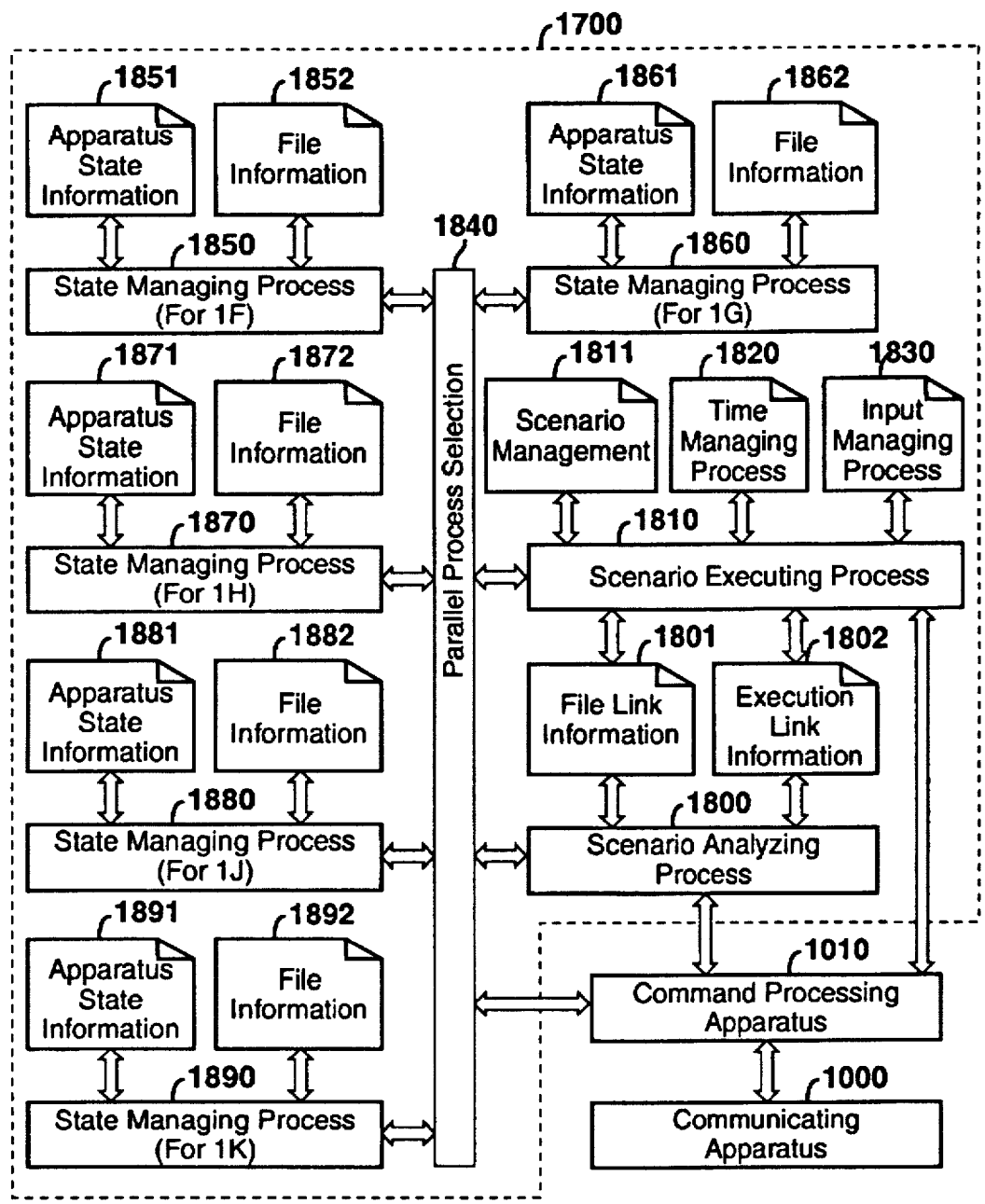
FIG. 18 shows an example of the operation of the reproduction managing process 1700.

FIG. 17 is a block diagram in which a reproduction managing process 1700 is added to the file server apparatus 1040 in FIG. 11. The reproduction managing apparatus 1110 differs from the file server apparatus 1040 in FIG. 11 with respect to the following construction, operation, and effects.

The different construction is that the reproduction managing process 1700 is newly added to the system bus 150 of the personal computer system 100C in FIG. 11. The operation of the reproduction managing process 1700 will now be described by using FIG. 18.

First, the reproduction managing process 1700 retrieves the image display apparatus connected to the network 1100. In case of FIG. 12, five image display apparatuses of 1F, 1G, 1H, 1J, and 1K are retrieved and state managing processes 1850, 1860, 1870, 1880, and 1890 corresponding to the image display apparatuses are formed. In a parallel process selection 1840, the plurality of formed state managing processes 1850, 1860, 1870, 1880, and 1890, a scenario executing process 1810, and the like are sequentially selected and a processing time to execute the own process is given to each process, thereby enabling a plurality of processes to be executed in parallel and enabling data to be exchanged among the processes. When the state managing processes 1850, 1860, 1870, 1880, and 1890 are formed, a network connection is performed to the image display apparatuses for which respective managing processes are responsible, by using a network connecting command C1 through the command processing apparatus 1010 at a timing selected by the parallel process selection 1840. Subsequently, states of the image display apparatuses of the connection destination are obtained by using a state report command C18. The states of the image display apparatuses and information on the file which can be executed by each image display apparatus are managed as apparatus state information 1851, 1861, 1871, 1881, and 1891 and file information 1852, 1862, 1872, 1882, and 1892. Here, the image display apparatuses 1F, 1G, 1H, 1J, and 1K connected to the state managing processes 1850, 1860, 1870, 1880, and 1890 report own changed states to the state managing processes 1850, 1860, 1870, 1880, and 1890 of the connection destination by using a state report command C17 when the own states change. Thus, the state managing processes 1850, 1860, 1870, 1880, and 1890 can hold the latest information of the image display apparatuses of the connection destination. When another process such as a scenario executing process 1810 or the like gives commands or scenarios to the state managing processes 1850, 1860, 1870, 1880, and 1890, the given commands or scenarios are transferred to the own connected image display apparatus. Thus, the image display apparatuses 1F, 1G, 1H, 1J, and 1K can be controlled by using the state managing processes 1850, 1860, 1870, 1880, and 1890.

The scenario executing process 1810 will now be described. As for the scenario which is executed by the scenario executing process 1810, it is now assumed that the commands shown in FIG. 10 and the network IDs of the image display apparatuses which execute the command are described so as to correspond to each other. When the reproduction managing process receives a scenario by an instruction of the operator, a scenario analyzing process 1800 analyzes the received scenario. File link information 1801 in which all of the files used in the scenarios and the network IDs of the image display apparatuses for reproducing the files are extracted and execution link information 1802 in which the network IDs of the image reproducing apparatuses corresponding to the commands are reported to the scenario executing process 1810.

In the scenario executing process 1810, the file information of the state managing process corresponding to the network IDs of the image display apparatuses in the file link information 1801 are obtained and compared with the corresponding file in the file link information 1801, thereby checking whether the file necessary for scenario reproduction exists in the image display apparatus or not. If no necessary file exists, the necessary file is transferred to the state managing process. The state managing apparatus writes the received file to the connected image display apparatus by using the file write command C19 or the like. Thus, the scenario received by the scenario analyzing process 1800 can be reproduced without any problem by the image display apparatus connected to the corresponding state managing process.

Further, in the scenario executing process 1810, the execution link information 1802 is examined and when the number of network IDs of the image display apparatus is only one, the description of the network IDs of the image display apparatuses are eliminated from the received scenarios and the resultant information is transmitted to the state managing process connected to the corresponding image display apparatus. Thus, the scenario received in the scenario executing process 1810 is executed by the image display apparatus designated by the network IDs. When there are two or more network IDs of the image display apparatus, the received scenario is registered into a scenario management 1811. After that, the commands described in the scenario are executed.

The operation in case of executing the scenario registered in the scenario management 1811 by the scenario executing process 1810 will now be described. In the scenario executing process 1810, the commands in the scenario registered in the scenario management 1811 and the network IDs of the image display apparatuses which execute the commands are sequentially read out and the read-out commands are transferred to the state managing process corresponding to the network IDs. In the state process, the received commands are transferred to the connected image display apparatus. Thus, by sequentially executing the scenarios registered in the scenario management 1811 by the scenario executing process 1810, the image display apparatuses 1F, 1G, 1H, 1J, and 1K can be controlled.

How to control the image display apparatuses 1F, 1G, 1H, 1J, and 1K by executing the scenario by the reproduction managing apparatus 1110 shown in FIG. 12 will now be described with respect to a case of operating and managing the image display apparatuses 1F and 1K and a case of synchronously reproducing the image display apparatuses 1G, 1H, and 1J. The scenario is described by using the commands shown in FIG. 10. The network IDs of the image display apparatuses 1F, 1G, 1H, 1J, and 1K are set to 1F, 1G, 1H, 1J, and 1K, respectively.

An example of an operation management scenario to control the operation and management of a plurality of image display apparatuses is shown in FIG. 19. The operation management scenario relates to an example in the case of reproducing the scenario, image, and audio data in a designated time by the image display apparatuses 1F and 1K.

19

(1) When an operation scenario in FIG. 19 is read out by the reproduction managing apparatus 1110, the operation scenario is analyzed by the scenario analyzing process 1800 and the file link information 1801 and execution link information 1802 are formed. In the scenario executing process 1810, a check is made from the file link information 1801 to see if an image A, a scenario A, and audio data A exist in the image display apparatus 1F and an image B, a scenario B, and audio data B exist in the image display apparatus 1K. If NO, the necessary images are written into each image display apparatus. Further, the execution link information 1802 is checked. In this instance, since the operation scenario controls the two image display apparatuses 1F and 1K, the read-out scenarios are registered into the scenario management 1811.

(2) In the scenario executing process 1810, L1 (first row) of the operation scenario registered in the scenario management 1811 is read and executed. Since L1 denotes a command to execute an action A at 8 o'clock, the scenario executing process 1810 registers into the time managing process 1820 so as to execute the action A at 8 o'clock. Subsequently, rows L2 and L3 are read and actions B and C are likewise registered together with the times into a time managing process 1820. Since the contents after L4 relate to functions of the actions A, B, and C, they are not executed until the functions are called. After that, the scenario executing process 1810 is set into a waiting mode because there is no command to be executed.

(3) When the time becomes 8 o'clock, the time managing process 1820 calls the scenario executing process 1810 so as to execute the action A. When the scenario executing process 1810 is called, the commands existing in the action A are sequentially executed. L5 denotes a command to display the image A to the image display apparatus 1F. The scenario executing process 1810 issues a command C6 to display the image A to the state managing process 1850. The state managing process 1850 transfers the received commands to the connected image display apparatus 1F. Thus, the image A is displayed on the image display apparatus 1F. A command of L6 is subsequently read out and is similarly executed and the image B is displayed on the image display apparatus 1K.

(4) When the time becomes 12 o'clock, the time managing process 1820 calls the scenario executing process 1810 so as to execute the action B. When the scenario executing process 1810 is called, the commands in the action B are sequentially executed. L9 denotes a command to reproduce the scenario A by the image display apparatus 1F. The scenario executing process 1810 issues a command C3 to execute the scenario A to the state managing process 1850. The state managing process 1850 transfers the received command to connected the image display apparatus 1F. Thus, the scenario A is reproduced by the image display apparatus 1F. Subsequently, a command of L10 is read out and is likewise executed and the scenario B is reproduced by the image display apparatus 1K.

(5) When the time becomes 17 o'clock, the time managing process 1820 calls the scenario executing process 1810 so as to execute the action C. When the scenario executing process 1810 is called, the commands in the action C are sequentially executed. L13 denotes a command to reproduce the audio data A by the image display apparatus 1F. The scenario executing process 1810 issues a command C9 to execute the audio data A to the state managing process 1850. The state managing process 1850 transfers the received command to the connected image display apparatus 1F. Thus, the audio data A is reproduced by the image display

20 apparatus 1F. The command of L10 is subsequently read out and is similarly executed and the audio data B is reproduced by the image display apparatus 1K.

By executing the above operations by the scenario executing process 1810, an operation scenario to control the image display apparatuses 1F and 1K is formed and is executed by the reproduction managing process 1700 of the reproduction managing apparatus 1110. Thus, the predetermined images, audio data, and scenarios can be reproduced in predetermined times by a plurality of image display apparatuses.

An example of a synchronous reproduction scenario to synchronously reproduce and control in a plurality of image display apparatuses is now shown in FIG. 20. The synchronous reproduction scenario relates to an example in the case where image display timings are synchronized among the image display apparatuses 1G, 1H, and 1J in FIG. 12 and the operation of the user is reflected to three image display apparatuses.

(1) When the synchronous reproduction scenario in FIG. 20 is read by the reproduction managing apparatus 1110, the synchronous reproduction scenario is analyzed in the scenario analyzing process 1800 and the file link information 1801 and execution link information 1802 are formed. In the scenario executing process 1810, a check is made from the file link information 1801 to see if the images A and D exist in the image display apparatus 1G and the images B and E exist in the image display apparatus 1H and the images C and F exist in the image display apparatus 1J. If NO, the necessary images are written into each image display apparatus. Further, the execution link information 1802 is examined. In this instance, since the operation scenario controls the three image display apparatuses 1G, 1H, and 1J, the read scenarios are registered into the scenario management 1811.

(2) The scenario executing process 1810 reads L1 (first row) of the synchronous reproduction scenario registered in the scenario management 1811 and executes it. Since L1 denotes a command to set the command C6 to display the image A into the image display apparatus 1G, the scenario executing process 1810 issues a command so as to set the command C6 into the state managing process 1860. The state managing process 1860 sets the received command into the connected image display apparatus 1G. Subsequently, L2 and L3 are read and are likewise executed and the command C6 is set into the image display apparatuses 1H and 1J.

(3) The scenario executing process 1810 subsequently reads L4 from the scenario management 1811 and executes it. L4 denotes a command to simultaneously execute the commands set in the image display apparatuses 1G, 1H, and 1J. The scenario executing process 1810 simultaneously issues a simultaneous execution command C30 to the state managing processes 1860, 1870, and 1880. When receiving this command, the state managing processes 1860, 1870, and 1880 transfer the simultaneous execution command to the connected image display apparatuses 1G, 1H, and 1J. Thus, the images A, B, and C are simultaneously displayed on the image display apparatuses 1G, 1H, and 1J.

In case of perfectly simultaneously executing the image display apparatuses 1G, 1H, and 1J, the scenario executing process 1810 directly issues the simultaneous execution command C30 to the command processing apparatus 1010 without passing through the state managing processes 1860, 1870, and 1880. When receiving the simultaneous execution command 30, the command processing apparatus 1010 sets destinations to a global state for the network 1100, and simultaneously transmits communication data including 1G, 1H, and 1J which are network IDs of the image display apparatuses 1G, 1H, and 1J. Thus, the same command simultaneously reach all of the image display apparatuses on the network. In this instance, when the network ID of a certain image display apparatus is included in the received command on the image display apparatus side, the received command is executed. Thus, the command can be perfectly synchronously executed. As mentioned above, as a communication protocol to simultaneously issue the same command onto a network 1100, a simultaneous communication in which the network IDs are made global by UDP (User Datagram Protocol) is well known.

(4) The scenario executing process 1810 subsequently reads L5 from the scenario management 1811 and executes it. Since L5 denotes a command (C29) to issue the command C6 to the image display apparatus 1G, to read the image D into a back display plane (display screen which is not displayed), the scenario executing process 1810 issues a command C6 to the state managing process 1860. The state managing process 1860 transfers the received command to the connected image display apparatus 1G. Thus, the image D is read to the back display screen by the image display apparatus 1G. Subsequently, commands of L6 and L7 are read out and are similarly executed and the images E and F are read to the back display screens by the image display apparatuses 1H and 1J.

(5) The scenario executing process 1810 subsequently reads out L8 from the scenario management 1811 and executes it. Since L8 denotes a command to set a command C8 to execute an effect A in three seconds into the image display apparatus 1G, the scenario executing process 1810 issues a command so as to set the command C8 into the state managing process 1860. The state managing process 1860 sets the received command into the connected image display apparatus 1G. Subsequently, L9 and L10 are read and are likewise executed and the command C8 is set into the image display apparatuses 1H and 1J.

(6) The scenario executing process 1810 subsequently reads L11 into the scenario management 1811 and executes it. Since L11 is a command to execute the action A when the operator operates the mouse 280 of the reproduction managing apparatus 1110 and moves the mouse in the range A, the scenario executing process 1810 registers the action A into an input managing process 1830 so as to execute the action A when the mouse 280 moves in the range A. Subsequently, L12 and L13 are read out and the actions B and C are likewise registered into the input managing process 1830 in a manner similar to the case where the mouse moves the ranges B and C.

(7) The scenario executing process 1810 subsequently reads L14 into the scenario management 1811 and executes it. L14 is a command to execute the action D. Therefore, when the operator operates the mouse 280 of the reproduction managing apparatus 1110 and clicks the mouse 280 in the range A, the scenario executing process 1810 registers the action D into the input managing process 1830 so as to execute the action D when the mouse 280 is clicked in the range A. L15 and L16 are subsequently read and the actions E and F are likewise registered into the input managing process 1830 in a manner similar to the case where the mouse is clicked in the ranges B and C. Since the contents L17 onwards are functions of the action A, B, C, D, E, and F, they are not executed until the functions are called. After that, the scenario executing process 1810 is set into a waiting mode because there is no command to be executed.

(8) When the mouse 280 moves in the range A, the input managing process 1830 calls the scenario executing process 1810 so as to execute the action A. When the scenario executing process 1810 is called, it sequentially executes the commands existing in the action A. Since L29 is a command to set a command C15 to display a cursor to a moving position into the image display apparatus 1G, the scenario executing process 1810 issues a command so as to set the command C15 to the state managing process 1860. The state managing process 1860 transfers the received command C15 to the connected image display apparatus 1G. Thus, when the mouse 280 is moved in the range A, the cursor moves on the image display apparatus 1G in accordance with it. Likewise, when the mouse 280 moves the ranges B and C, the actions B and C are executed and the cursor is moved on the image display apparatuses 1H and 1J in accordance with the movement of the mouse 280. By the above operations, if the ranges A, B, and C are arranged in a manner similar to the display ranges of 1G, 1H, and 1J of the multi screen projection display 720 of FIG. 12, by sequentially moving the mouse 280 in the ranges A, B, and C, the cursor is sequentially moves on the display ranges of 1G, 1H, and 1J on the multi screen projection display 720. That is, by moving and operating the mouse by the reproduction managing apparatus 1110, the operation to move the cursor on the multi screen projection display 720 is executed in accordance with the moving operation.

(9) When the mouse 280 is clicked in the range A, the input managing process 1830 calls the scenario executing process 1810 so as to execute the action D. When the scenario executing process 1810 is called, the process 1810 sequentially executes the commands existing in the action D. Since L37 denotes a command to simultaneously execute the commands set into the image display apparatus 1G, the scenario executing process 1810 issues the simultaneous execution command C30 to the state managing process 1860. When receiving this command, the state managing process 1860 transfers the simultaneous execution command to the connected image display apparatus 1G. Thus, the effect A is executed for three seconds in the display range 1G on the multi screen projection display 720 and the image D is displayed. Similarly, when the mouse 280 is clicked in the range B, the action E is executed and the effects A and B are executed for three seconds in the display ranges 1G and 1H on the multi screen projection display 720 and the images D and E are displayed. Likewise, when the mouse 280 is clicked in the range C, the effects A, B, and C are executed for three seconds in the display ranges 1G, 1H, and 1J on the multi screen projection display 720 and the images D, E, and F are displayed.

As described above, the reproduction managing apparatus 1110 monitors a plurality of image display apparatuses 1F, 1G, 1H, 1J, and 1K and issues the command to each image display apparatus and reproduces and manages, so that the following meritorious effects are realized.

(1) The files which a plurality of image display apparatuses have are managed and compared with the file that is used in the scenario before executing the scenario, and lacking file is previously transferred, so that the scenario can be executed without any problem.

(2) By forming and executing the operation scenario, predetermined images, audio data, and scenarios can be reproduced for a predetermined time by a plurality of image display apparatuses.

(3) By forming and executing the simultaneous execution scenario, the images can be simultaneously displayed or the effects can be simultaneously executed by a plurality of image display apparatuses.

(4) By forming and executing the simultaneous execution scenario, the cursor which moves among a plurality of image display apparatuses can be displayed.

In the above embodiment, the existence of the file is checked before the scenario is executed by the image display apparatus and lacking file is transferred prior to executing the scenario. However, a transfer ability of the network and a reproduction time of the scenario are checked and if there is no problem even when the lacking file is transferred on as-required basis, there is no need to previously transfer the file.

When a lacking file is transferred prior to executing the scenario, it takes a time to start the execution of the scenario, which may sometimes pose a problem. To avoid this, transferring of the lacking file can be completed in advance by using a scenario test command C31 shown in FIG. 10. The scenario command C31 is a command for checking whether the designated scenario can be executed without any problem or not and, if there is a lacking file, for transferring and recording the file to the image display apparatus to execute it.

In the above embodiment, the scenario is formed and the reproducing operations of a plurality of image display apparatuses are managed by the reproduction managing apparatus 1110. However, the invention is not limited to the image display apparatuses and other apparatuses on the network 1100, namely, the database apparatus 1D, multimedia editing apparatus 1E, and the like can be also controlled. In this instance, commands which can be executed by the apparatus to be controlled are examined by using a command report command C32 shown in FIG. 10 and the control is adaptively carried out. The command report command C32 can check all of the commands which can be executed by unknown apparatuses.

The reproduction managing process 1700 may be installed on the image display apparatus (for example, 1F) so that the image display apparatus 1F may execute the commands to be used for the own apparatus and also perform the reproduction management of the other image display apparatuses. With this, there is no need to provide the reproduction managing apparatus 1110 on the network 1100.

Further, it is also possible to construct a communication system for transmitting and receiving images among the image display apparatuses on the network 1100 by using an image transfer command C7 shown in FIG. 10. For example, when the image displayed on the image display apparatus 1F is transferred to the image display apparatus 1K and is displayed there, when the image display apparatus 1F receives a command to instruct the operator to transfer the image in the range D in the image memory 610 to the image display apparatus 1K, the command processing apparatus 1010 of the image display apparatus 1F processes so as to compress the image in the range D in the image memory 610 by the image processor 510A and to extract the compressed image and transfers the extracted image to the image display apparatus 1K by the image transfer command C7. When receiving the image transfer command C7, the image display apparatus 1K expands the transferred compressed image data by the image processor 510A of the image display apparatus 1K and writes the expanded image data into the displayed image memory (for example, image memory 610) and displays. Thus, since the dedicated processor compresses and expands the image and the compressed image data is transferred on the network, a communication using the image can be performed at a high response speed.

What is claimed is:

1. An image display apparatus comprising:

a computer including an input/output bus, a communicating apparatus, connected to said input/output bus, for transmitting and receiving data and a command to/from another apparatus connected via a communication line, and a command processing apparatus for interpreting and executing the command received by said communicating apparatus;

a decoding apparatus, connected to said input/output bus, for decoding compressed data received by said communicating apparatus into original image data;

an image memory for recording the decoding images from said decoding apparatus and many as at least two display planes;

a video processing apparatus for reading out said decoded images from said image memory and converting said images into a display signal;

a display apparatus for displaying an output of said video processing apparatus as a color image;

an image data dedicated bus to which said decoding apparatus, said image memory, and said video processing apparatus are connected; and a signal line to connect said image memory and said video processing apparatus, wherein said command received by said communicating apparatus is transferred to said command processing apparatus through said input/output bus, said command processing apparatus interprets said command and controls the operations of said communicating apparatus, said decoding apparatus, and said video processing apparatus, further, said compressed data received by said communicating apparatus is transferred to said decoding apparatus to said input/output bus, said decoding apparatus records the decoded image data into said image memory through said image data dedicated bus, said decoded image data from said image memory is transferred to said video processing apparatus through said dedicated signal line and is video processed by said video processing apparatus, and, after, the video processed image data is displayed by said display apparatus.

2. An apparatus according to claim 1, wherein an audio processing apparatus is connected to said input/output bus and audio non-compressed data or audio compressed data received by said communicating apparatus is reproduced by said audio processing apparatus in accordance with the control of said processing apparatus (and is reproduced).

3. A computer system comprising:

an image display apparatus according to claim 1; and a file recording apparatus having a communicating apparatus and a command processing apparatus, said image display apparatus and file recording apparatus being connected by said communication line, wherein at least compressed images are recorded in said file recording apparatus, and when an image transfer command as a request to transfer the compressed image is transmitted from said image display apparatus via the communication line, said command is received by said communicating apparatus, said command is interpreted and executed by said command processing apparatus, the compressed image is transferred from said file recording apparatus to said video processing apparatus, and the compressed image transmitted from said file recording apparatus through the communication line is expanded as displayed in said image display apparatus.

4. A reproduction managing apparatus comprising:

a plurality of image display operate according to claim 1; and a reproduction managing apparatus having a communicating apparatus and a command processing apparatus, said image display operate and reproduction managing apparatus being (are) connected by said communication line, wherein said reproduction managing apparatus installs a plurality of state managing operate for managing states of said plurality of image display operate and a scenario executing apparatus for executing a scenario programmed by using a command to control operations of said plurality of image display operate, said state managing operate and said image display operate are made to correspond in a one to one relational manner through said communication line, said state managing apparatus always obtains and manages a file which said corresponding image display apparatus has in a state of the operation thereof through the communication line, and the following operations (a) and (b), namely (a) said scenario executing apparatus interprets a command described by said scenario, discriminates said image display apparatus to process said interpreted command, and issues a command to said corresponding state managing apparatus, and (b) when receiving said command, said state managing apparatus issues the command to said corresponding image display apparatus through the communication line, are executed until there is no command of said scenario.

5. An apparatus according to claim 4, wherein a scenario analyzing apparatus to analyze contents of said scenario is connected to said scenario executing apparatus, the contents of the scenario to be executed or analyzed by said scenario analyzing apparatus, said image display apparatus to reproduce a file used in said scenario is extracted and compared with the state of the file that is managed by said state managing apparatus, and when there is no file necessary to execute the scenario, a necessary file is given to the corresponding image display apparatus through the communication line.

6. An apparatus according to claim 4, wherein a time managing apparatus for managing a time to execute the command is connected to said scenario executing apparatus, said scenario executing apparatus sets the time to execute the command and a command to be executed at that time into said time managing apparatus, when the time set by said scenario executing apparatus comes, said time managing apparatus reports a request to execute said set command to said scenario executing apparatus, and the command reported by said time managing apparatus is executed by said scenario executing apparatus, thereby controlling operations of said plurality of image display apparatuses in accordance with the time.

7. An apparatus according to claim 4, wherein an input managing apparatus to manage an input of an operator is connected to said scenario executing apparatus, said scenario executing apparatus sets inputting conditions of an operator and a command to be executed at that time into said input managing apparatus, when there is an input corresponding to the command instructed by said scenario executing apparatus, said input managing apparatus reports a request to execute said set command to said scenario executing apparatus, and the command reported by said time managing apparatus is executed by said scenario executing apparatus, thereby controlling operations of said plurality of image display apparatuses in accordance with the input of an operator.

8. A database apparatus comprising:

a computer system including an input/output bus, a communicating apparatus, connected to said input/output bus, for transmitting and receiving data and a command to/from another apparatus connected by a communication line, a command processing apparatus for interpreting and executing the command received by said communicating apparatus, and a database into which compressed images have been recorded with retrieving conditions;

a database processing apparatus for retrieving said database and reading out a compressed image or the like which meets said retrieving conditions;

a decoding apparatus, connected to said input/output bus, for decoding compressed data received by said communicating apparatus and compressed data recorded in said database into original image data;

an image memory for recording the decoded original image data from said decoding apparatus as many at least two display planes;

an image comparison operation processing apparatus for simultaneously reading out the images of at least two display planes from said image memory and then executing a comparison operation of the images;

an image data dedicated bus to which said decoding apparatus, said image memory, and said image comparison operation processing apparatus are connected; and a signal line for connecting said image memory and said image comparison operation processing apparatus, wherein an image retrieving command received by said communicating apparatus is transferred to said command processing means through said input/output bus, said command processing apparatus interprets said image retrieving command, the compressed image serving as retrieving conditions sent together with said command is decoded by said decoding apparatus and is written as a retrieving condition image into said image memory, the following processes (a) and (b), namely, (a) said command processing apparatus requests said database processing apparatus to output an image as a retrieval image, the compressed image read out from said database processing apparatus is decoded by said decoding means and is written as a comparison image into another image memory in which said retrieving condition image is not written, and (b) said image comparison operation processing apparatus simultaneously reads out said retrieving condition image and said comparison image which was newly written, executes a comparison operating process, and reports to said another apparatus whether said two images satisfy the retrieving conditions or not, are repeated until there is no image as retrieving target, the image which satisfies the retrieving conditions of said retrieving condition images is retrieved, and the retrieval result is reported.

9. An apparatus according to claim 8, wherein two or more images are designated in the retrieving conditions by said image retrieving command, two or more retrieving condition images are written in the two or more display planes in said image memory, the following processes (a) and (b), namely (a) said command processing apparatus requests said database processing apparatus to output an image as a retrieval image and a compressed image read out from said database processing apparatus is decoded by said decoding means and is written as a comparison image into another image memory in which said retrieving condition image is not written, and (b) said image comparison operation processing apparatus simultaneously reads out said retrieving condition images of two or more display planes and said comparison image into which was newly written, executes comparison operating processes, and reports to said another apparatus whether the images of three display planes satisfy the retrieving conditions or not, are repeated until there is no image as a retrieving target, the image which satisfies the retrieving conditions of said retrieving condition images retrieved, and the retrieval result is reported.

10. An apparatus according to claim 8, wherein an audio comparison operation processing apparatus disconnected to said input/output bus, an audio retrieving command received by said communicating apparatus is transferred to said command processing means through said input/output bus, said command processing apparatus interprets said audio retrieving command, and audio data serving as retrieving conditions sent together with said command is written as retrieving condition audio data into said audio comparison operation processing apparatus, the following process (a), namely (a) said command processing apparatus requests said database processing apparatus to output audio data serving as a retrieving target, the audio data read out from said database processing apparatus is written as comparison audio data into said audio comparison operation processing apparatus, and said audio comparison operation processing apparatus executes a comparison operating process of another retrieving condition audio data, and said comparison audio data and reports to said another apparatus whether said two audio data satisfy the retrieving conditions or not, is repeated until there is no audio data serving as a retrieving target, audio data which satisfies the retrieving conditions of the retrieving condition audio data is retrieved, and the retrieval result is reported.

11. An image editing system comprising:

a computer including an input/output bus, a communicating apparatus, connected to said input/output bus, for transmitting and receiving data and a command to/from another apparatus connected by a communication line, and a command processing apparatus for interpreting and executing the command received by said communicating apparatus;

a decoding apparatus, connected to said input/output bus, for restoring or decoding compressed data received by said another apparatus into original image data;

an image memory for recording decoded messages from said decoding apparatus as many as at least two display planes;

a video processing apparatus for reading out said decoded images from said image memory and converting into a display signal;

a display apparatus for displaying an output of said video processing apparatus as a color image;

an image data dedicated bus to which said decoding apparatus, said image memory, and said video processing apparatus are connected;

a signal line to connect said image memory and said video processing apparatus;

an image editing apparatus for editing and processing the images recorded in said image memory; and an image input apparatus and an image printing apparatus which are controlled by said image editing apparatus, wherein said command received by said communicating apparatus is transferred to said command processing apparatus through said input/output bus, said command processing apparatus interprets said command and controls operations of said communicating apparatus, said decoding apparatus, said video processing apparatus, and said image editing apparatus, wherein said image editing apparatus controls said image input apparatus and fetches the images and records into said image memory, said compressed data received by said communicating apparatus is transferred to said decoding apparatus through said input/output bus, said decoding apparatus records the decoded image data into said image memory through said image data dedicated bus, said image editing apparatus is controlled by said command processing apparatus and processes and edits the images recorded in said image memory, the edited images recorded in said image memory are transferred to said video processing apparatus through said dedicated signal line and are video processed by said video processing apparatus, and after that, the video processed images are displayed by said display apparatus, the edited images recorded in said image memory are read out by said image editing apparatus and are printed by said image printing apparatus, and the edited images recorded in said image memory are read out by said command processing apparatus and are transferred to another apparatus by using said communicating apparatus, thereby allowing input, editing and printing of images through the communication line.

12. A system according to claim 11, wherein an audio editing apparatus is connected to said input/output bus, an audio inputting apparatus and an audio outputting apparatus are connected to said audio editing apparatus, and audio data inputted by said audio inputting apparatus or audio data received by said communicating apparatus is audio edited by said audio editing apparatus in accordance with a control of said command processing apparatus.

13. A system according to claim 12, wherein a multimedia editing apparatus is connected to said input/output bus and said image editing apparatus and said audio editing apparatus are controlled by said multimedia editing apparatus, thereby editing a scenario to control a procedure for reproduction of the image and audio data.

* * * * *